Dec. 4, 1962    F. KALWAITES    3,066,359
METHODS AND APPARATUS FOR PRODUCING FIBROUS WEBS
Filed Feb. 7, 1958    6 Sheets-Sheet 1
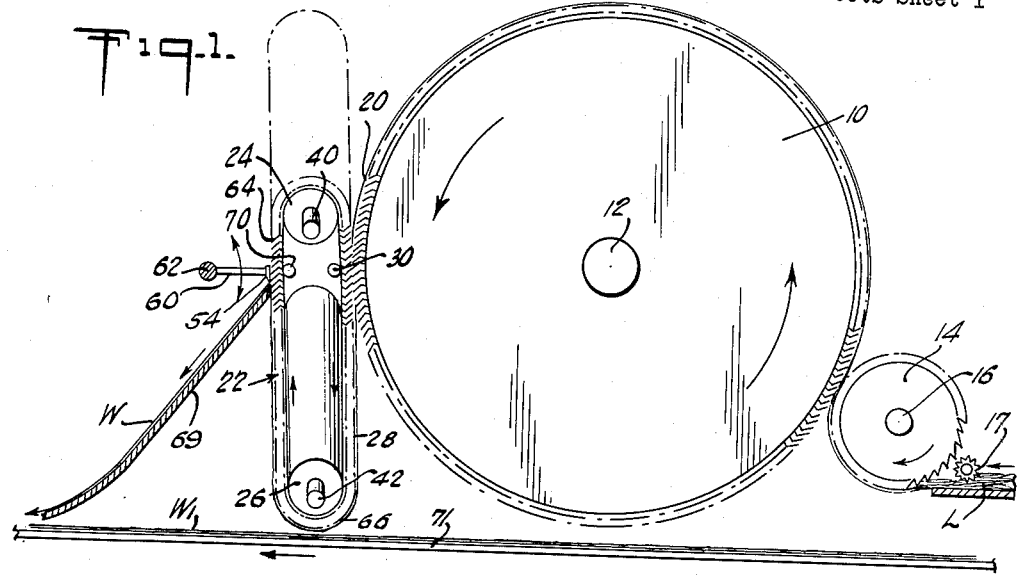
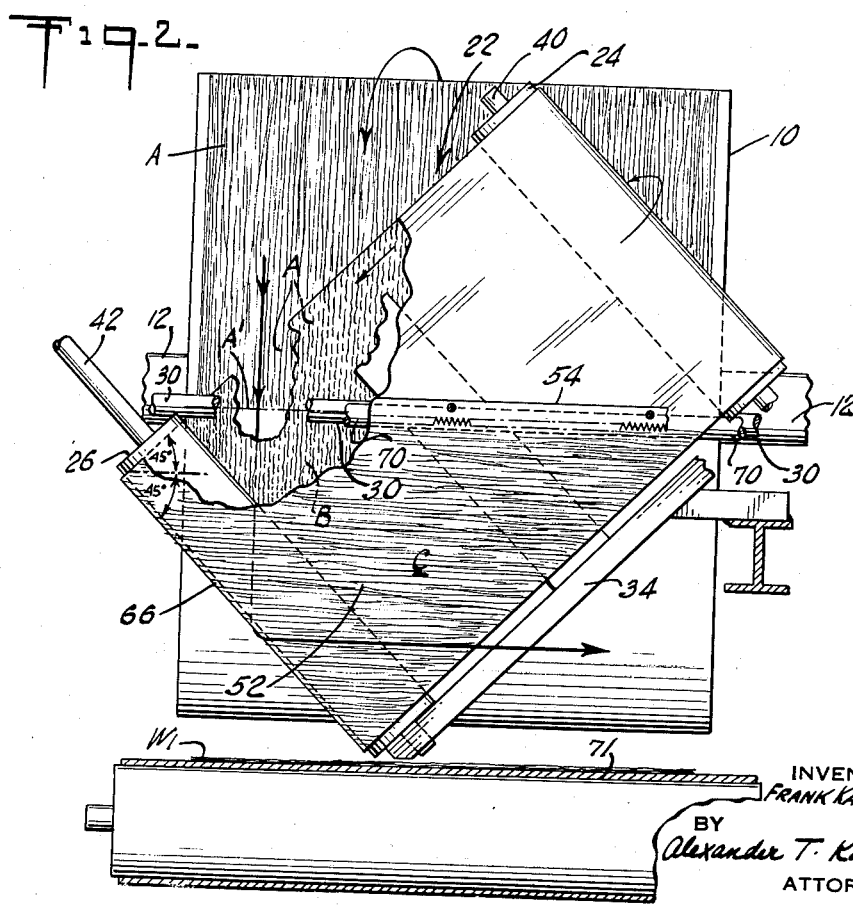
INVENTOR
FRANK KALWAITES
BY
Alexander T. Kardos
ATTORNEY

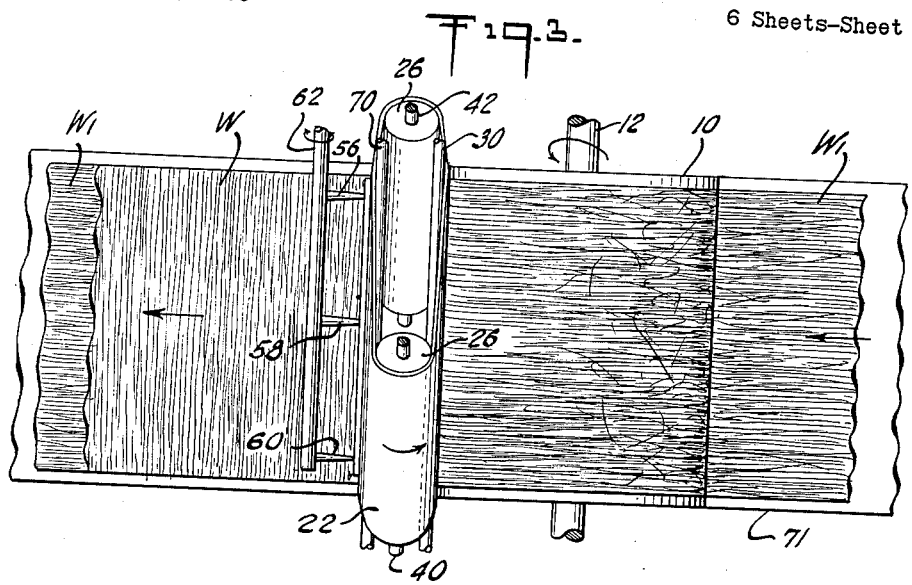
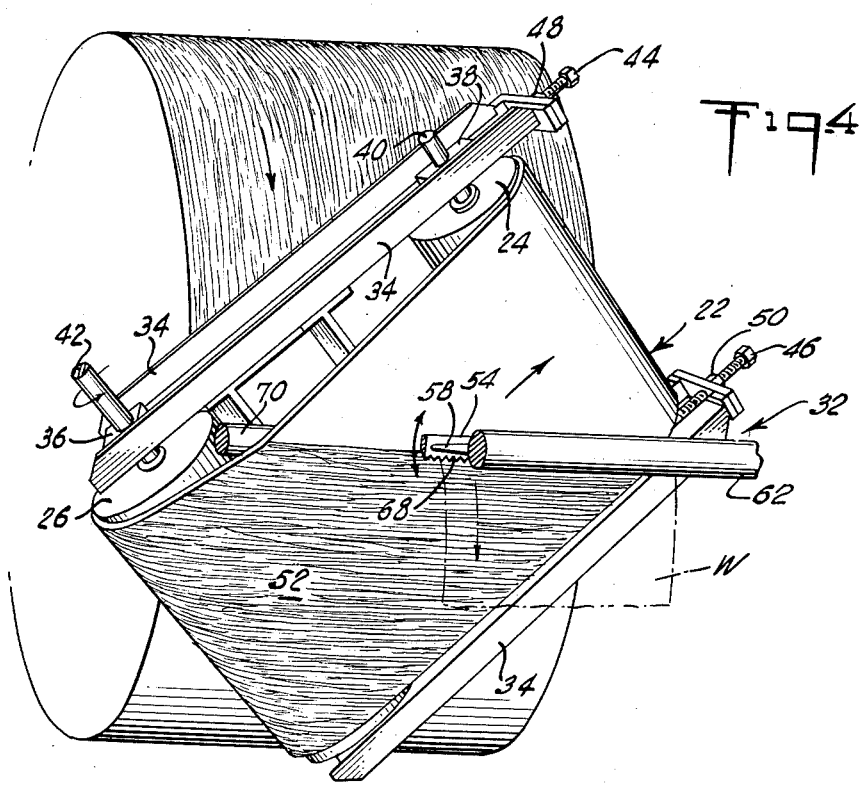

Dec. 4, 1962 F. KALWAITES 3,066,359
METHODS AND APPARATUS FOR PRODUCING FIBROUS WEBS
Filed Feb. 7, 1958 6 Sheets-Sheet 3
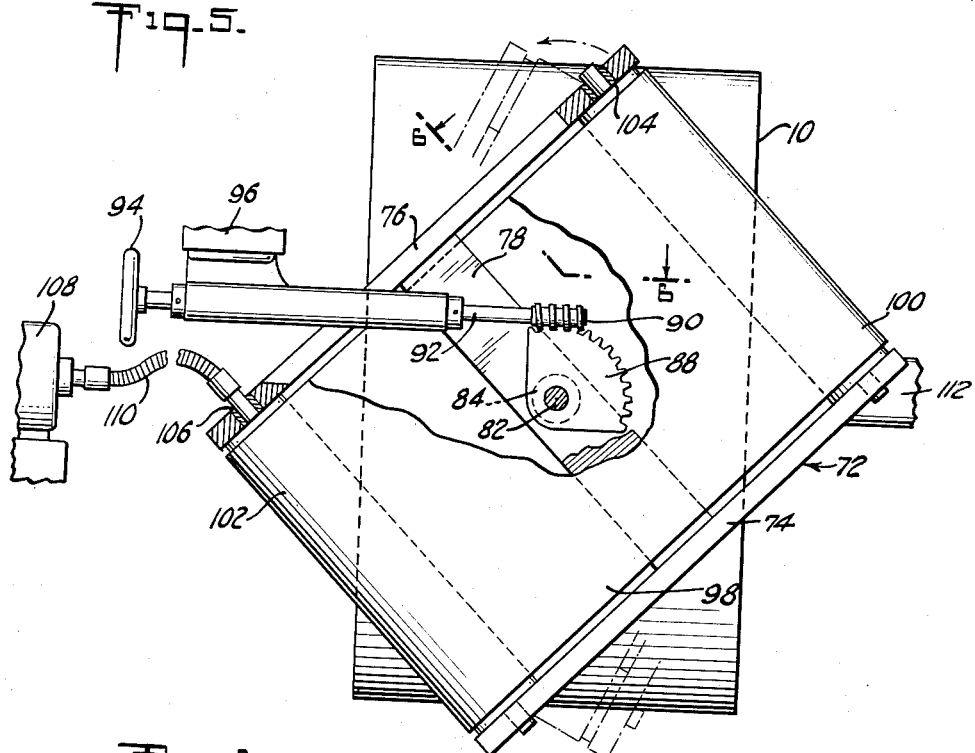
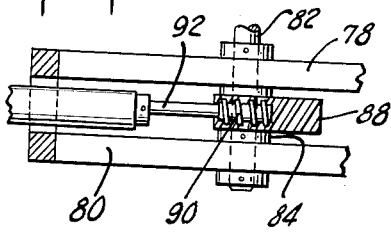
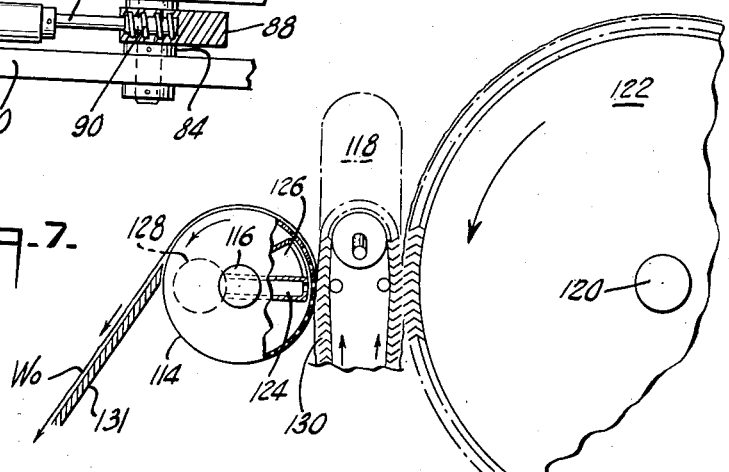
INVENTOR
FRANK KALWAITES
BY
Alexander T. Kardos
ATTORNEY

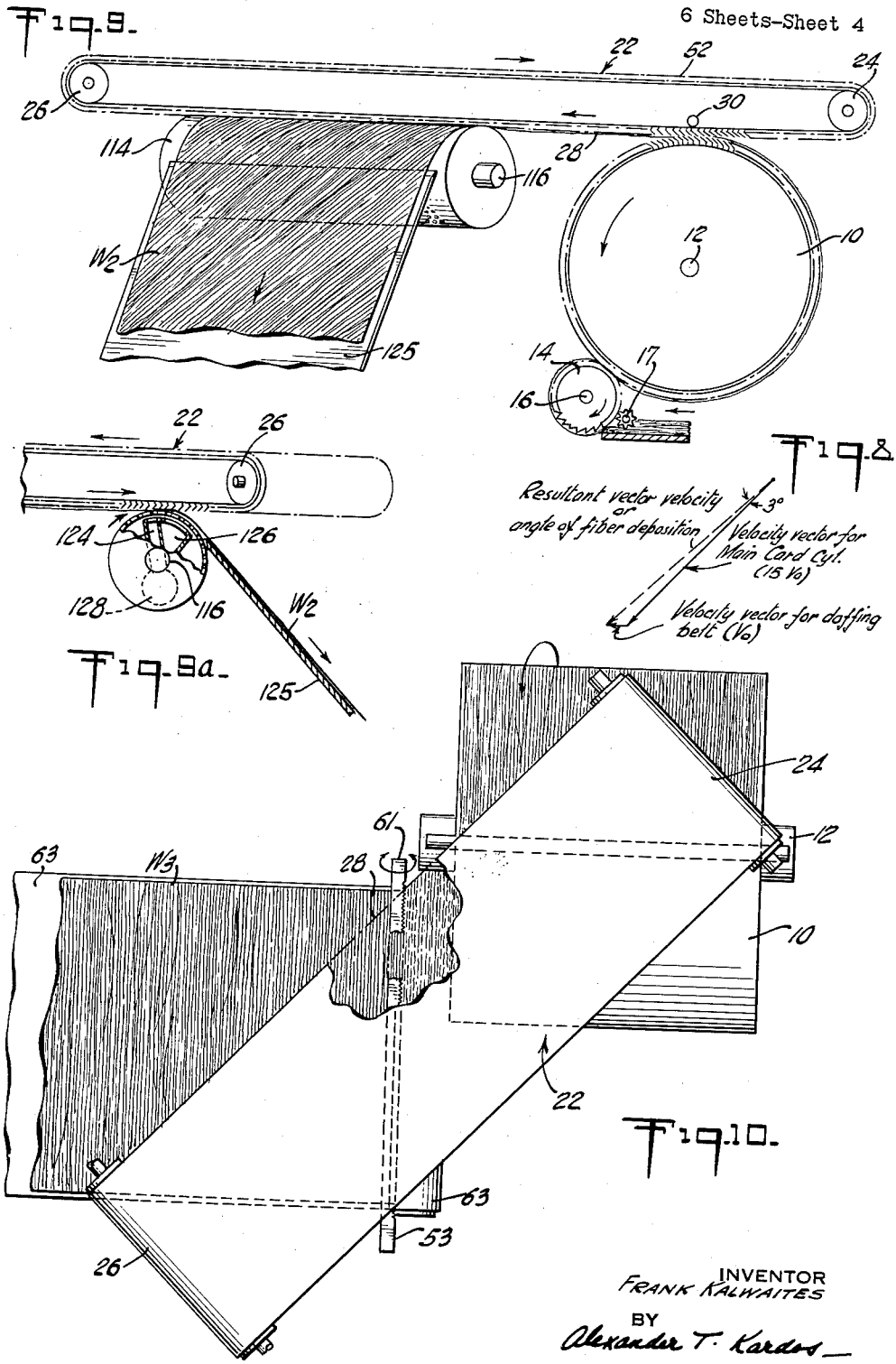

Dec. 4, 1962

F. KALWAITES 3,066,359

METHODS AND APPARATUS FOR PRODUCING FIBROUS WEBS

Filed Feb. 7, 1958

INVENTOR.
FRANK KALWAITES
BY
Alexander T. Kardos
ATTORNEY

Dec. 4, 1962 F. KALWAITES 3,066,359
METHODS AND APPARATUS FOR PRODUCING FIBROUS WEBS
Filed Feb. 7, 1958 6 Sheets-Sheet 6
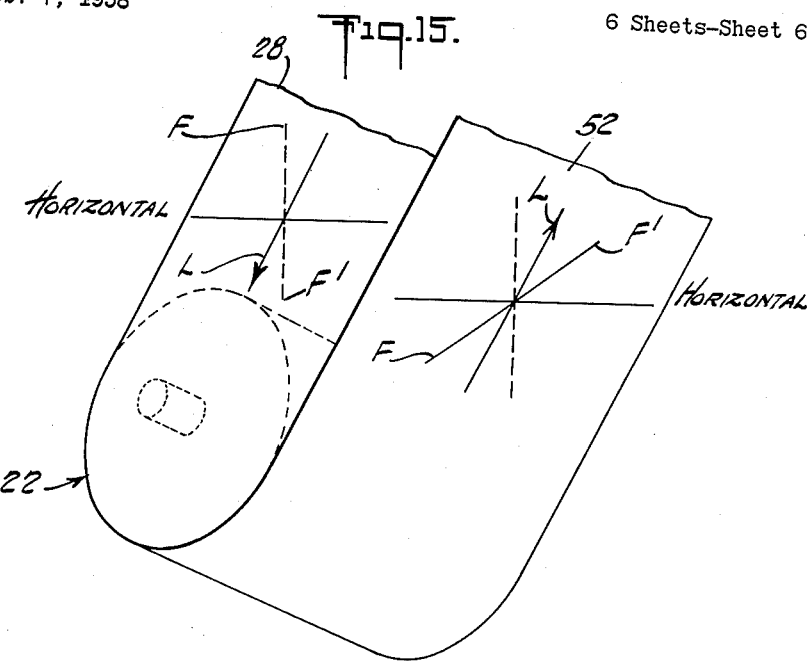
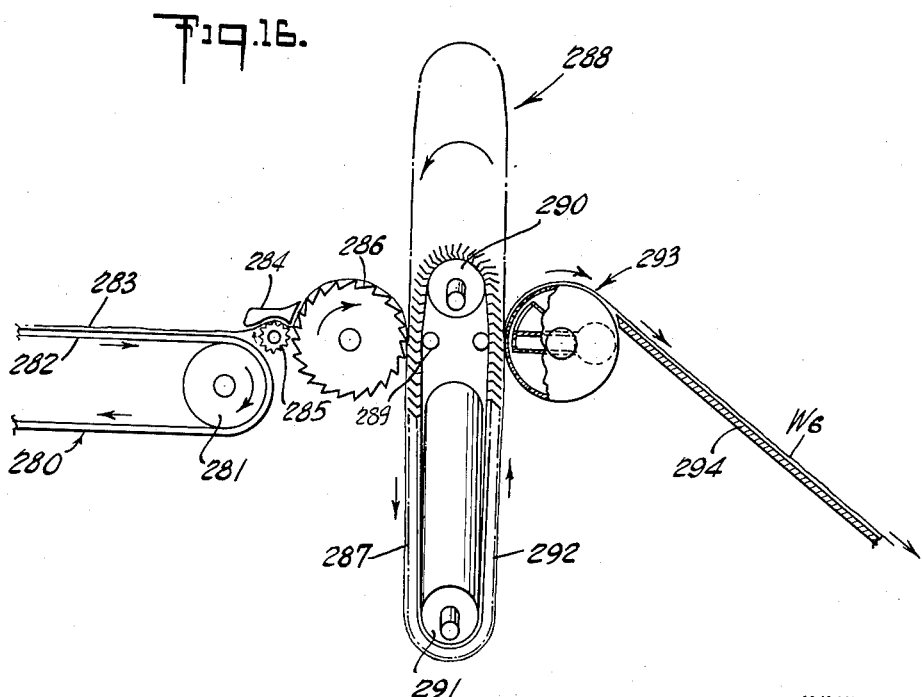
INVENTOR
FRANK KALWAITES
BY
Alexander T. Kardos
ATTORNEY

United States Patent Office 3,066,359
Patented Dec. 4, 1962

3,066,359
METHODS AND APPARATUS FOR PRODUCING FIBROUS WEBS
Frank Kalwaites, Somerville, N.J., assignor to Chicopee Manufacturing Corporation, a corporation of Massachusetts
Filed Feb. 7, 1958, Ser. No. 713,994
16 Claims. (Cl. 19—155)

The present invention relates to nonwoven webs of fibrous materials, to nonwoven fabrics made therefrom, and to improved methods and apparatus for producing the same. More specifically, the present invention is concerned with improved methods and apparatus for producing nonwoven webs and nonwoven fabrics of fibrous materials wherein the fibers are oriented predominantly in one direction and lie at an angle greater than 0° and up to and including 90° to the long axis of the fibrous web or fabric.

Nonwoven webs of fibrous materials and nonwoven fabrics made therefrom have become increasingly commercially important in the textile and related industries during the past decade because of their low cost of manufacture for a given coverage, as compared to the relatively higher cost of more conventional textile fabrics formed by spinning, weaving, knitting and felting operations.

Nonwoven fabrics are conventionally manufactured at the present time from a basic starting fibrous material comprising a more or less tenuous web of loosely associated textile fibers disposed in sheet form. This conventional basic starting fibrous material for nonwoven fabrics is formed from any of the common textile-length fibers, or mixtures thereof, the fibers varying in average length from about one-half inch to about two and one-half inches or more. Illustrative of such fibers are the natural fibers, notably cotton; the synthetic fibers, such as rayon, cellulose acetate, "Orlon" acrylic fibers, "Dacron" polyester fibers, "Vinyon," and nylon; or mixtures of various proportions thereof. These fibers are conventionally processed through suitable textile machinery, such as, for example, a conventional card, to form a very thin fibrous web or sheet of loosely associated fibers weighing from as light as about 50 grains per square yard to as heavy as about 500 grains or more per square yard.

This very thin, essentially two-dimensional web or sheet of fibers is produced continuously with the fibers "predominantly oriented" in the "machine direction," i.e., the major or long axis of the fibrous web, which is the direction in which the web is formed and is moved continuously from the carding machine. In such a web, the "degree of fiber orientation" in the machine direction may range from about 70% to about 90% or higher.

The two terms employed in the preceding paragraph to describe the fiber orientation in a card web should be explained. It is difficult to determine fiber orientation directly and precisely in a card web because the individual fibers of the web are in fact curled and bent, with different segments of each fiber extending in various directions. However, two kinds of *average* orientation may be ascertained which are helpful in describing such a web. One of these is called the "*degree* of fiber orientation" in a given direction. The other may be called the "direction of *predominant* fiber orientation."

The "degree of fiber orientation" in the machine direction is determined by (1) bonding the card web uniformly with a material such as starch, (2) drying the bonded web, (3) measuring tensile strengths lengthwise and crosswise of the resulting fabric, and (4) computing the percentage of lengthwise or long strength of the fabric to its total strength. Total strength, for this purpose, is the arithmetical sum of the tensile strengths in the long and cross directions.

It is seen that, when long and cross tensile strengths are equal, the "degree of fiber orientation" in the machine direction is 50%. If the long tensile strength of the bonded fabric is 90% of the total of the tensile strengths of the fabric in the long and cross directions, the "degree of fiber orientation" in the machine direction obtaining in the card web is 90%.

For simplicity, a web of fibers having a "degree of fiber orientation" in the machine direction of 90% might, if desired, be thought of in idealized form as having 90% of its fibers substantially parallel to the long axis of the web and 10% substantially parallel to the cross axis of the web.

Another idealized concept of a card web having fibers 90% oriented in the machine direction is to think of the card web as comprised entirely of pairs of straight, crossed fibers with each fiber of any given pair lying upon the hypotenuse of a right triangle whose side parallel to the machine direction is 90 units long and whose side lying perpendicular to the machine direction is 10 units long. Each separate fiber of such a crossed pair of fibers is inclined more toward the long axis of the web than toward the cross axis, and thus the fibers as a group are said to be "predominantly oriented" in the machine direction. The term "direction of predominant orientation" of the fibers of a web is thus employed in this specification and claims to mean that direction which bisects the acute angle between any pair of crossed fibers in this idealized conception of an oriented web.

To say that the "predominant fiber orientation" in a given web is in a certain direction means that more than 50% of the fibers are oriented in that direction. This is equivalent to saying that the "degree of fiber orientation" in the direction in question is greater than 50%.

Because of the drafting action of a carding machine, the fibers in a card web are normally "predominantly oriented" in the machine direction. The "degree of fiber orientation" in the machine direction, however, depends upon the severity of the drafting action and the extent to which it is continued during carding.

The fibrous nonwoven webs produced by a carding machine are further processed, treated and bonded by various methods known to the art and which do not relate directly to the present inventive concept. Regardless of the further processing and bonding, however, the basic fact remains that the fibers are predominantly oriented in the web generally in the longitudinal direction thereof, which orientation leads to many advantages and some disadvantages in the bonded nonwoven fabric.

The most important of these disadvantages is the difference in the physical properties and characteristics, notably the tensile strength, of the bonded nonwoven fabric in the long direction, as compared to the cross direction. This, of course, is due to the fact that the fibers lie predominantly oriented in the direction of the long axis and thus give the bonded fabric considerable strength in that direction. And, naturally, since the fibers are not oriented to any very significant extent in the cross direction, they produce little, if any, strength in that direction.

Considerable time and much effort has been expended in the textile industry, for example, to the concept of eliminating these disadvantages and differences in properties and characteristics by bonding several of these nonwoven webs together with their oriented fibers and long axes at angles around the compass to each other to more or less equalize the tensile strengths and other properties and characteristics in all directions and particularly the long and cross directions. Such efforts have produced nonwoven fabrics which have not contained the great differences in properties and characteristics measured in these directions which were possessed by their predecessors but the expensive nature of their production and other defects have rendered them of dubious commercial value.

Other efforts in the prior art have been directed to the re-orienting of the fibers in the nonwoven web after it has been formed and removed as a web from the carding machine. One of such efforts has involved the use of angularly disposed rotating brushes lightly contacting the surfaces of the moving nonwoven webs and the intent was to brush the fibers into the desired angular relationship with respect to the long axis of the web. Another method has involved the use of air jets which were directed in oblique directions slantingly upon the surfaces of the moving nonwoven webs to urge the fibers to assume the desired angular relationship. Such methods have been only moderately successful and have not proved to be commercially acceptable. As a consequence, there still remains considerable room for improvement in this field.

Another more recent effort to bring about the desired angular relationship of the fibers to the long axis of the nonwoven web has involved the use of a continuously movable, flexible doffing belt covered with card clothing and positioned (1) immediately adjacent the main card cylinder so as to establish a line of close proximity therewith and (2) at such an angularity with respect to the main card cylinder as to be capable of doffing the fibers therefrom and forming a web wherein the fibers possess the desired angular relationship to the long axis of the web. Such methods and apparatus for carrying out such methods are more fully described in the pending patent application of Hans H. Schiess, Serial Number 697,138, filed November 18, 1957.

It has been observed, however, in the use of such apparatus and methods, that, when greater fiber angularity with respect to the long axis of the web is desired, greater difficulties and disadvantages are created thereby. For example, the greater the desired fiber angularity, the greater is the decrease in width of the fibrous web which is doffed from the main card cylinder to the doffing belt. This is due, of course, to the trigonometric relationship of the card and the doffing belt involved. Additionally, the greater the desired fiber angularity, the greater is the deviation of the angle of actual fiber deposition on the doffing belt from the angle of theoretical fiber deposition due to the geometric positioning of the card cylinder and the doffing belt and their velocity vector relationship. As pointed out in said previously-filed patent application, the deviation may be about 3° or higher under certain circumstances. And, finally, as the desired change in angular relationship increases above 45° and passes about 60°, for example, the efficiency of fiber transfer decreases sharply due to the sharpness of the angle of the fiber transfer and the shift in fiber positioning. As a result, the use of such methods and apparatus to produce nonwoven webs wherein the fibers lie at an angle between about 60° and 90° to the long axis do not now appear to be commercially practicable.

In the method of the present invention, a plurality of fibers are first oriented predominantly in a given direction in an arrangement defining a first surface, referred to hereinafter as an orienting surface, and this arrangement of fibers defining an orienting surface is moved in one direction. The fibers are then transferred from the orienting surface to a second surface, referred to hereinafter as a receiving surface having a line of close proximity with the orienting surface, ordinarily with substantially the same orientation of the fibers as was present immediately before the transfer being maintained during the transfer. The receiving surface usually moves at an angle to a plane normal to the line of close proximity just mentioned, at a lesser linear speed than the linear speed of the orienting surface, and the greater the discrepancy in these two speeds the more nearly is the predominant fiber orientation exactly maintained.

In the second step of the method of this invention, the fibers are removed from the receiving surface at a second continuous line of proximity adjacent the receiving surface, by means of a doffer comb or other device, while still preferably maintaining substantially the predominant orientation of fibers existing just before said removal. As removed, the fibers comprise a continuous assemblage of fibers in which the direction of predominant fiber orientation is at an angle to the longitudinal axis of the fiber assemblage of from above 0° up to and including 90°. In contrast to the prior art, an angle of predominant fiber orientation of from about 60° up to about 90° may readily be attained in accordance with the invention. Moreover, the width of the final assemblage of fibers may be substantially the same as, or even greater than, the width of the initial arrangement of fibers on the orienting surface.

The final assemblage of fibers removed at a second continuous line of proximity, as just described, is thereupon conveyed away from such line for use, typically, in production of a nonwoven fabric.

In the accompanying drawings and the following specification, there are illustrated and described preferred embodiments of the methods and apparatus of the present inventive concept for producing nonwoven webs of fibrous materials, but it is to be understood that the inventive concept is not to be considered as limited to the embodiments disclosed, except as determined by the scope of the appended claims. Referring to the accompanying drawings:

FIGURE 1 is a diagrammatic side elevation view, partly in cross section, showing the main card cylinder and the doffing belt of the present inventive concept, with the axis of the supporting rollers of the doffing belt positioned angularly with respect to the axis of the main card cylinder;

FIGURE 2 is a fragmentary front elevation of the main card cylinder and doffing belt of the present inventive concept with portions thereof broken away and removed to show interior construction more clearly;

FIGURE 3 is a plan view of the main card cylinder and doffing belt of the apparatus of FIGURE 2, with some of the auxiliary elements removed;

FIGURE 4 is a fragmentary perspective drawing showing the angular relationship of the doffing belt to the main card cylinder and some details of the supporting structure for the doffing belt;

FIGURE 5 is a fragmentary front elevation of the main card cylinder and a modification of the doffing belt construction of FIGURES 1 through 4;

FIGURE 6 is a fragmentary cross-section taken on the line 6—6 of FIGURE 5, showing details of the interior construction of the adjusting means for the belt supporting structure;

FIGURE 7 is a fragmentary schematic drawing of the main card cylinder and doffing belt of the present inventive concept, somewhat similar in illustrative concept to FIGURE 1, showing a modification of the doffing means to remove the nonwoven web from the doffing belt;

FIGURE 8 is a vector diagram showing the theoretical velocity vectors of the peripheral linear speed of the main card cylinder and the linear speed of the doffing belt and the resultant theoretical vector velocity or the angle of fiber deposition on the doffing belt;

FIGURE 9 is a diagrammatic side elevational drawing showing the main card cylinder and a modification of the doffing belt of the present inventive concept;

FIGURE 9A is a fragmentary front elevation showing the operation of the vacuum doffing means of FIGURE 9 in greater detail;

FIGURE 10 is a fragmentary plan view of the main card cylinder and another modified doffing belt with portions thereof broken away and removed to show interior constructions more clearly;

Figure 11:
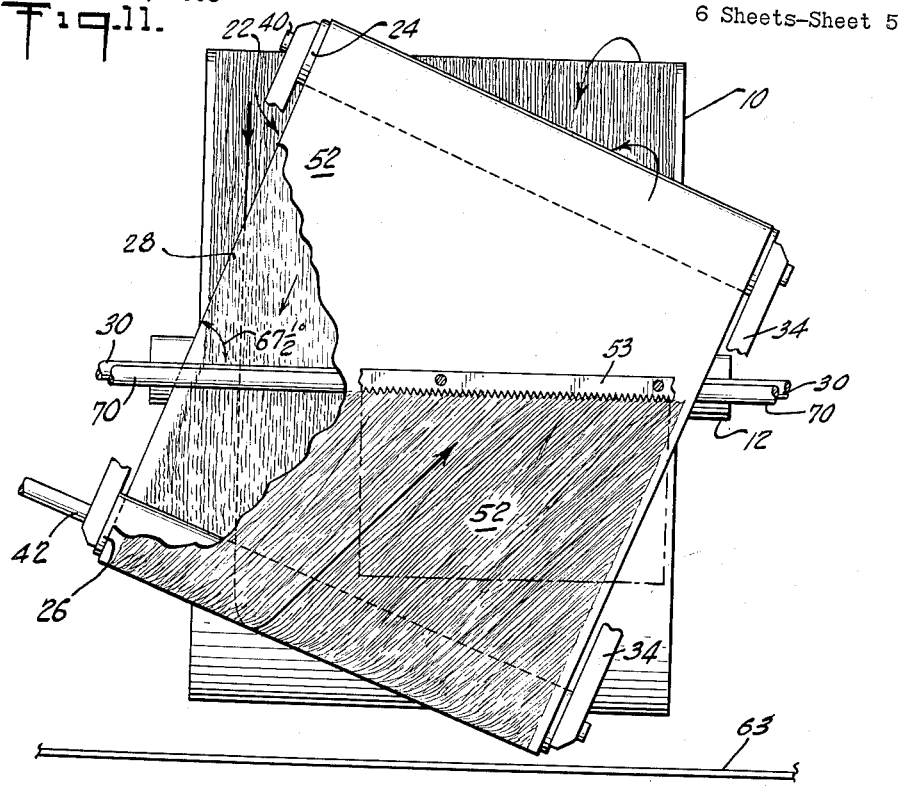
FIGURE 11 is a fragmentary front elevation of the main card cylinder and doffing belt of the present inventive concept with the doffing belt at a different angle to the main card cylinder than that set forth in FIGURE 2 and with portions thereof broken away and removed to show interior constructions more clearly.

FIGURE 15 is a fragmentary diagrammatic perspective view showing how the angular relationship of the fibers is effected by removing the fibers from the outer reach of the doffing belt; and FIGURE 16 is a diagrammatic side elevation view, partly in cross section, showing another modification of the present inventive concept wherein a high speed worker roll is used to transfer the plurality of fibers to the doffing belt.

As shown in the drawings and with particular reference to FIGURE 1, a rotatable main card cylinder 10 is mounted on a main drive shaft 12 and is capable of being driven in the direction indicated at desired rotational speeds by conventional driving means (not shown). A rotatable licker-in 14 mounted on a shaft 16 and a feed roll 17 are carried in bearings in the card sides. The licker-in 14 is positioned adjacent the main card cylinder 10 and is capable of gradually feeding a lap L of fibrous materials (such as cotton) into the main card cylinder whereby the individual fibers thereof are carded and aligned in a direction of predominant fiber orientation which extends circumferentially along the cylindrical surface of the card in a plane at right angles or perpendicular to the axis of rotation of the card cylinder. In this way, the fiber assemblage on the card describes a cylindrical fiber orienting surface which is circular or arcuate in cross-section in a given plane taken perpendicular to the axis of rotation of the main card cylinder.

The fibers aligned as just described upon the surface of a conventional card cylinder ordinarily have a degree of fiber orientation of greater than 60% in the direction of their predominant orientation. For emphasis, the fibers in FIGURE 1 and the other figures of the drawing are all shown as having a degree of fiber orientation at about 95% in the particular direction of predominant orientation which is shown.

The main card cylinder 10 is preferably of the conventional type used in the textile industry and comprises a large cylindrical cast-iron shell of the usual type. The usual width of such a shell is about 45 inches and its usual outside diameter is about 50 inches. The peripheral surface of the card cylinder 10 is covered or helically wrapped in the conventional manner with the usual card clothing containing many fine, closely spaced, specially bent card wires 20 having a diameter of from about 0.009 to about 0.017 inch. The closeness of the spacing of these card wires may be realized by the fact that the number of card wires per square foot of the conventional card clothing is in the range of from about 50,000 to about 100,000.

The main cylinder 10 is driven during carding operations in the direction indicated at a rotational velocity under normal conditions of from about 150 to about 300 revolutions per minute and preferably from about 160 to about 220 revolutions per minute. This is equivalent to a peripheral linear velocity of the main card cylinder (50 inch diameter) of from about 650 yards per minute to about 1300 yards per minute and preferably from about 690 to about 960 yards per minute.

Other conventional parts of the feed-works, which also include the feed plate, the mote knives, the division panel, the licker-in cover, the licker-in screen, etc., have been omitted from the drawings for the purpose of clarity. Other conventional card machine elements such as the back-plate, the card flats, the cylinder screens, the front plate, etc., have also been omitted from the various figures of the drawing to show more clearly the predominant orientation of the fibers on the main card cylinder.

A doffing belt 22 is positioned immediately adjacent the main card cylinder to provide a fiber receiving surface for transfer of the fibers from the orienting surface of the card cylinder 10. Doffing belt 22 comprises an endless belt which is mounted on and is moved continuously in the direction indicated by a driving roll 26 in conjunction with a suporting roll 24. The doffing belt 22 may have a width corresponding to the width of the main card cylinder 10 but this width may be more or less depending upon the particular angular positioning of the doffing belt with respect to the card cylinder. The doffing belt may have any desired length and in the embodiment shown in FIGURE 1 the length of the doffing belt is such that its width, regardless of its angular relationship to the card, will come into close proximity with the full face or width of the card cylinder.

As illustrated most clearly in the embodiments of FIGURES 2–4, the axes of doffing belt rolls 24 and 26 are parallel and lie in a vertical plane which is parallel to the main axis 12 of the main card cylinder 10 and are so spaced therefrom that the inner reach 28 of the doffing belt 22 also defines a vertical plane which is substantially in close proximity with the peripheral surface of the main card cylinder 10.

It will be apparent from FIGURE 1 that proper positioning of the substantially planar surface of the inner reach 28 of doffing belt 22 with respect to the peripheral surface of the main card cylinder 10 results in a narrow area or line of close proximity between the two surfaces. In actual practice, it has been found advantageous to create such an area or line of close proximity by bringing the two surfaces relatively close to each other and then bending or curving the inner reach 28 of the belt 22 slightly out of its plane toward the peripheral surface of the main card cylinder 10 by means of a positioning rod or roller 30. In this way, the line of close proximity between the two surfaces is more accurately controlled and more narrowly defined.

If desired, card cylinder 10 may be replaced by a fiber orienting surface of another form, so long as the fiber orienting and receiving surfaces together define a line of close proximity. Thus, for example, one may use as a fiber orienting surface a flexible belt covered with card clothing which passes over a positioning rod or roller similar to member 30 to produce a bend or deflection opposite the bend in the inner reach of the doffing belt. Or, if desired, the line of close proximity with the doffing belt may be established, with the flexible belt serving as an orienting surface, at the position where the flexible belt passes over one of its supporting rollers, at which position the supporting roller would also be serving as a positioning rod or roller.

In every case, the area of close proximity between the fiber orienting and receiving surfaces must be quite narrow to effect transfer of fibers; and it is to emphasize this that the term "line" of close proximity is employed. The width of the line of close proximity between the card cylinder and the card belt is substantially the same as the width of the line of close proximity between a standard card cylinder and a standard doffing cylinder, when operating under conventional conditions.

As shown in FIGURE 1, wherein the axes of rolls 24 and 26 are angularly positioned with respect to the main shaft 12 of the main card cylinder 10, the line of close proximity is horizontal, extending angularly across the face of the doffing belt 22 from one edge to the other edge at an angle of 45° thereto. In FIGURES 2–4, the axes of the doffing belt rolls 24 and 26 are also parallel to each other in their substantially vertical plane with their projections at an angle of 45° to the main shaft 12 of the main card cylinder. The line of close proximity is also horizontal and extends at an angle of 45° across the face of the doffing belt 22. This is best shown in FIGURES 2 and 4. The pertinency and importance of this angular relationship will become clearer from a further description and discussion thereof hereinafter.

Slack-adjusting or other tension-control means 32 (see FIGURE 4) may be provided for the endless doffing belt 22. A cradle or frame 34 is mounted adjacent the main card cylinder 10 and contains bearings 38 and 36 in which the shafts 40 and 42 of the doffing belt rolls 24 and 26, respectively, are rotatably mounted. Bearing 38 is an adjustably-mounted, slidable bearing capable of controlled sliding movement within the frame 34 and of being secured in the desired adjusted position by bolts 44 and 46 provided with lock nuts 48 and 50. Manual adjustment of sliding bearing 38 will adjust the tension on the doffing belt 22. Other more automatic adjusting means, such as spring-loaded devices, may be used, if desired. Bearing 36 is fixedly mounted in the frame 34 but it is to be appreciated that, if desired, it could also be adjustably mounted therein, similarly to bearing 38. Bearings 36 and 38 each comprise one of a pair of bearings for the ends of shafts 42 and 40, respectively, with the lower bearing of each pair of bearings not visible in FIGURE 4.

The doffing belt 22 is covered or wrapped with conventional card clothing containing many fine, closely spaced card wires 64 (see FIGURE 1) normally of about the same construction and fineness as the card clothing on the main cylinder. The fineness of the card wires on the doffing belt may, however, be varied with respect to the fineness of the card wires on the card cylinder. Thus, for example, they may be slightly finer or slightly coarser than the wires on the card cylinder. The doffing belt 22 is made of rubber, leather, cloth, synthetic materials, man-made plastics, or other equivalent flexible materials in which the card wires 64 are mounted in conventional fashion similarly to the mounting of the card wires 20 upon main card cylinder 10. If desired, however, the construction of the card wires on the card clothing may be modified from conventional types of constructions to facilitate the easy removal of the fiber assemblage from the card wires of the doffing belt without disturbing the predominant fiber re-orientation.

The direction and inclination of the card wires 64 and 20 on the doffing belt 22 and the main card cylinder 10, respectively, are shown clearly in FIGURE 1. Such directions and inclinations are necessary because in the transfer or doffing of the fibers from the main card cylinder to the doffing belt, the bends in wire 64 should be opposed to the bends in wires 20 in a point to point relationship and the "hooks" formed by the bends must move in opposition one to the other, when conventional card clothing is employed. This is required to effect proper transfer of the fibers from the main card cylinder to the doffing belt.

The doffing belt 22 moves at a considerably slower linear velocity than the peripheral linear velocity of the main card cylinder 10 and is in the range of from about 15 yards per minute to about 100 yards per minute, and preferably from about 20 to about 70 yards per minute.

The peripheral linear velocity of the main cylinder 10 and the linear velocity of the doffer belt 22 may be varied from the ranges set forth above, depending upon the particular conditions and circumstances involved but, in any event, the ratio of the peripheral linear velocity of the main cylinder 10 to the linear velocity of the doffer belt 22 should be at least about 10 to 1 for satisfactory commerical operation, with preferred ratios of these velocities ranging from about 20 to 1 to about 60 to 1.

Velocity ratios of less than about 10 to 1 may sometimes be used, such as down to about 5 to 1 or even lower, but, as will be discussed hereinafter, such lower ratios introduce greater discrepancies between the theoretical direction and the actual direction at which the fibers are transferred from the card wires 20 of the main card cylinder 10 to the card wires 64 of the doffer belt 22. Additionally, at such lower ratios, the efficiency of fiber transfer is decreased.

The main card cylinder 10 is thus so positioned and spaced relatively with respect to the moving surface of the doffing belt 22 as to establish substantially a continuous narrow area or line of close proximity therewith, whereby fibrous materials may be doffed from the main cylinder 10 and transferred to the moving belt 22 in the same way in which fibers are transferred from the main card cylinder to the doffing cylinder in a conventional carding machine. The exact extent and nature of the continuous line of close proximity between the main cylinder and the doffing belt is obtained by making either or both adjustable with respect to each other to control their clearance, spacing and angularity.

The belt positioning rod or roller 30 is adjustable, as desired, and is capable of being secured in its adjusted position whereby any desired clearance between the card wires 20 of the main card cylinder 10 and the card wires 64 of the doffing belt 22 is maintained. This clearance is the usual clearance conventionally maintained between a main card cylinder and a doffing roll and is on the order of from about 0.005 inch to about 0.020 inch and is normally about 0.007 inch to about 0.009 inch for cotton, for example.

Adjustability of the angular relationship between the main card cylinder and the doffing belt, such as illustrated in FIGURES 2–4, is normally obtained by manually positioning the two at the desired angle and securing them in the desired position. In the event that frequent changes of the angular relationship are required or desired, it is preferable to mount the doffing belt in an adjustably rotatable cradle so constructed as to rotate substantially in a plane. Such a construction will be described in greater detail hereinafter.

The exact mechanism of the fiber transfer from the main cylinder to the doffing belt is not precisely known but it is believed that the fibers on the card wires of the card clothing of the main cylinder make contact with the card wires of the card clothing on the doffing belt and are transferred thereto. The relatively higher velocity of the main cylinder causes the individual fibers to be laid in predominantly oriented relationship on the surface of the doffing belt in the original predominant fiber orientation and direction which prevailed on the main card cylinder at the line of close proximity rather than taking the direction of movement of the doffer belt. At the same time, however, the fibers as a group on the doffer belt move simultaneously with the doffer belt as an assemblage of fibers on the belt which is moving in a new, changed direction relative to the main card cylinder. It is therefore seen that the individual fibers remain substantially in their original predominant orientation but sidle or move sidewise forwardly on the doffing belt at an angle to the long direction of the web thereon.

This is shown most clearly in FIGURE 2. In that figure, area "A," which extends to line $A^1$, at the line of close proximity between the main cylinder and the doffing belt, shows the predominant orientation of the fibers on the cylindrical surface of the main card cylinder 10.

Area "B" shows the predominant orientation of the fibers on the inner reach 28 of the doffing belt 22 below line A¹. The figure very clearly illustrates that the predominant fiber *orientation* has not basically changed and that the fibers are still pointed in the same direction, although the fiber *movement*, both individually and as an assembage, has changed 45°.

More precisely, the actual angle of individual fiber deposition and the resulting predominant orientation of the whole group of fibers on the doffing belt is not exactly the same as the individual fiber angle and predominant orientation of that obtained on the main card cylinder. Strictly speaking, the angle of fiber deposition on the doffing belt is the angle of the resultant vector of (1) the theoretical large velocity vector of the peripheral linear velocity of the main cylinder and (2) the relatively small theoretical linear velocity vector of the doffer belt. A vector diagram is shown in FIGURE 8 for the velocities and their directions when the main shaft of the main cylinder and the axis of the doffing belt rollers are positioned at an angle of 45° and the linear surface velocities of the main cylinder and the doffing belt have a ratio of about 15 to 1. It is to be observed that the resulting angle of fiber deposition is about 3° less than the angle of the peripheral linear velocity for the main cylinder under the conditions stated. This angle is, of course, relatively very small and becomes negligible as the ratio of the velocities increases. On the other hand, if velocity ratios of less than 15 to 1, say as low as 5 to 1 or lower, are used, this angle will increase considerably above 3°.

As the fibers are carried downwardly in area "B" in the above-described configuration on the inner reach 28 of the doffing belt 22, they ultimately reach the lowermost cylindrical portion 66 of the doffing belt 22 which is in direct contact with the supporting roll 26. The fibers are carried around this lower cylindrical portion 66 and emerge on the front or outer reach 52 of the doffing belt 22. An unusual result is disclosed as the fibers emerge from behind the lower cylindrical portion 66 of the doffing belt. When the fibers were disposed on the inner reach 28 of doffing belt 22, they possessed a predominant fiber orientation extending substantially in a vertical direction (see area "B"), and had a basic angular disposition of 45° to the edges of the inner reach 28. However, after the fibers have emerged onto the outer reach 52 of the doffer belt 22 to start upwardly thereon, and have completely reversed their basic direction of movement by 180° in doing so, they possess a predominant fiber orientation extending substantially in a horizontal direction (see area "C") without changing their basic angular disposition of 45° to the edge of the outer reach of the doffing belt 22. Thus, the fibers in area "C" are aligned in a predominantly horizontal orientation while they are carried by the outer reach 52 which also moves substantially in a vertical plane, similarly to and spaced from the inner reach 28.

The outer reach 52 of the doffing belt cooperates with a rapidly oscillating conventional doffer comb 54 (see FIGURES 3 and 4) secured by brackets 56, 58 and 60 to a horizontally positioned rapidly oscillating shaft 62, the axis of which is positioned angularly with respect to the direction of movement of the doffing belt 22. In FIGURES 2–4, this angular relationship is 45°, but such angle has been selected primarily for illustrative purposes. The angle may be any acute angle greater than 0°. If the angle were not less than 90°, i.e., were not an acute angle, no additional shift in fiber orientation would be produced by the transfer of the fibers from the doffing belt. With an angle of 90°, no fiber shift would be produced by this step. In order to achieve an angular shift in fiber orientation of significant magnitude from a practical standpoint, the angle should be less than about 75°. An angle of 75° will introduce a fiber orientation shift of about 15°. On the other hand, the practical structural limitations on the maximum length of the doffing belt and the maximum length of the doffing comb for a given width of a starting fibrous web make it desirable to keep the angle at least about 15°. If the angle were 0°, the process would become inoperative, since the doffing belt and doffing comb would then have to be of infinite length.

To put it another way, the angle between the line of close proximity defined by outer reach 52 of doffing belt 22 and doffer comb 54 and a plane *normal* to the direction of movement of said outer reach must be greater than 0° and less than 90°. From a practical standpoint, for the same reason as given before, this angle should be at least about 15° but no greater than 75°.

It is preferred, as is true in the embodiments of FIGURES 2 through 4, that the angle last specified, i.e., the angle between the doffing means and the plane normal to the direction of movement of the doffing belt be approximately equal to the angle between the direction of movement of said outer reach and a plane normal to the line of close proximity between card cylinder 10 and inner reach 28 of doffing belt 22. The changes in fiber angularity introduced (1) at the transfer to the doffing belt and (2) by removal from the doffing belt will then be approximately the same. The efficiency of each of these steps is roughly equivalent at given angular shifts, and thus the method as a whole will operate most efficiently when the magnitude of the two shifts is approximately the same. It is this distribution of the total change in fiber angularity over two steps in the method of this invention that makes it possible to produce a predominant fiber orientation of as high as 90° to the longitudinal axis of the resulting nonwoven web.

The operation and functioning of the comb 54 is conventional and should need no further description other than to note that the teeth 68 of the comb 54 oscillate in a short arcuate path with the axis of horizontally positioned shaft 62 as a center. The teeth 68 of the comb 54 are so positioned relatively with respect to the planar surface of the outer reach 52 of the doffing belt 22 as to form a narrow area of close proximity therewith and provide for removal of the nonwoven fibrous web. In the embodiment shown, the direction of movement of the fibers thus removed from outer reach 52 is, at least in the zone immediately adjacent the line of close proximity between the doffing belt and the doffer comb, perpendicular to that line. The horizontally extending fibers on the card wires 64 of the doffing belt 22 can thus be removed to form a fibrous web W wherein the fibers retain their horizontally extending orientation but, due to the change in direction of web movement brought about by the action of the comb teeth 68, are now disposed substantially at 90° to the direction of web movement. Such direction of predominant fiber orientation and degree of fiber orientation in web W are best shown in FIGURES 3 and 4.

The fibrous web W thus peeled from the card wires 64 of the doffing belt 22 by the teeth 68 of the doffing comb is then directed outwardly and downwardly over inclined guide surface 69, which supports the assemblage of fibers as they slide downwardly thereon away from the doffing belt. Guide surface 69 serves as a "conveyor" for the fibers in that it provides a means for effecting a transfer of the fibers from doffing belt 22 to conveying belt 71. As hereinafter pointed out, other means for conveying the fibers away from the doffing belt, either stationary or moving, may be used in lieu of the stationary guide surface 69.

As shown most clearly in FIGURE 3, the fibrous web W may be laid upon a fibrous web $W_1$ formed by a conventional card, doffer roll and associated conventional elements, wherein the fibers are predominantly oriented in the machine direction, which is carried upon conveyor belt 71. The resulting cross laid double card web is then further processed as desired.

An adjusting or positioning rod or roller 70 may, if desired, be positioned behind the outer reach 52 of the doffing belt 22 to deflect the outer reach 52 slightly out of its vertical plane whereby the line of close proximity between the outer reach 52 and the surface of oscillation of the rapidly oscillating comb teeth 68 is more accurately controlled and more narrowly defined.

In FIGURE 1, guide surface 69 is shown as a flat slide, preferably formed of polished metal, disposed at an angle to the vertical. The slant of the slide is preferably steep enough to cause the force of gravity to move the assemblage of fibers down the guide surface away from the doffer comb, and at the same time gradual enough that the loosely associated fibers will not be torn apart but will maintain their coherency as they move down the slide.

If the line or area of close proximity between the doffing belt and the doffer comb is disposed at an angle to the horizontal such angle should not be so large that the assemblage of fibers W will slip off the guide surface in a direction transverse to the direction of movement away from the doffer comb. When the slide is tilted to one side in this way at the doffer comb, it should be curved to bring the transverse axis of the assemblage of fibers into a horizontal plane as soon as possible without stretching the web so much that its coherency is adversely affected.

The means for moving the final fiber assemblage away from the doffer comb may, if desired, be an endless conveyor belt moving at the same speed as the linear speed at which the doffing belt approaches and passes by that device.

In any case in which a tilted doffer comb makes it necessary to tilt the guide surface transversely in that portion of the surface immediately adjacent the comb, suction means may be employed in connection with a foraminous conveyor belt to hold the fiber assemblage against transverse slipping. For example, the foraminous belt may be trained over one or more suction boxes positioned behind the belt in those areas in which the tilt of the conveyor is so great that the fibers will not be held on the belt by the force of friction but will tend to slip off the belt.

In the operation of the embodiment of the invention shown in FIGURES 2-4, fibrous materials are fed to the main card cylinder and are carded and aligned thereon into a relatively high degree of predominant fiber orientation which extends peripherally along and around the cylindrical surface of the main card cylinder. A doffing belt having an inner reach positioned sufficiently close to the cylindrical surface of the main card cylinder as to form a line of close proximity therewith but having a direction of movement angularly disposed, say 45°, with respect to the tangential direction of movement of the main card cylinder at the line of close proximity, doffs the fibers from the main card cylinder. The fibers are transferred to the doffing belt and retain the basic direction of predominant fiber orientation they possessed at the line of close proximity on the main card cylinder due to the high velocity of the main card cylinder as compared to the relatively low velocity of the doffing belt. The fibers, however, as they are transferred to the doffing belt assume the direction of movement thereof which is 45° to the line of close proximity. Thus, the fibers move individually and as a whole in the direction of movement of the doffing belt but with their original direction of predominant fiber orientation at an angle of 45° to the edge of the doffing belt.

When the fibers reach the lowermost portion of the vertically downwardly moving inner reach of the doffing belt and reverse direction to start upwardly on the vertically moving outer reach of the doffing belt, their predominant fiber orientation with respect to the vertical is changed 90°, due to the trigonometric relationship involved, and they automatically attain a horizontal direction of predominant fiber orientation. As they move vertically upwardly on the outer reach of the doffing belt with such an orientation, they are removed therefrom by a doffer comb which is positioned at an angle of 45° to the direction of movement of the doffing belt whereby the resulting web is free to move forwardly with the fibers disposed at 90° to the direction of final web movement.

The resulting web may then be plied with another web or up to as many as 10 or 12 other webs in cross-laid manner, or otherwise, as desired.

The 90° angular relationship of the fibers to the long axis of the nonwoven web is the result and sum of (1) the initial angular shift of 45° obtained at the first area or line of close proximity between the main card cylinder and the inner reach of the doffing belt and (2) the second shift of 45° obtained at the second area or line of close proximity between the outer reach of the doffing belt and the doffing comb.

Figure 14:
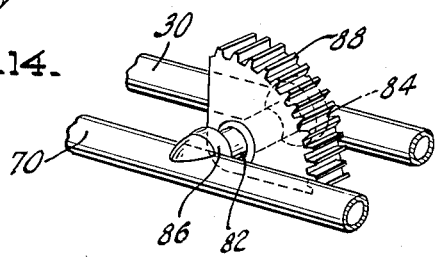
FIGURE 14 is a detailed perspective view showing the construction of the positioning rods and the worm gear and stub shaft for the modification shown in FIGURES 5 and 6.

Angular changes of the predominant fiber orientation with respect to the long axis of the nonwoven web other than 90° may be desired or required. In FIGURES 5, 6 and 14, there is illustrated a modification of the doffing belt and associated elements wherein the angular relationship of the longitudinal axis of the doffing belt with respect to the line of close proximity between the belt and the main card cylinder may be readily adjusted and controlled to obtain any desired angular relationship from 45° in one angular direction to 45° in the opposite direction. As a result, the shift in predominant fiber orientation may be substantially controlled through a range from above 0° up to and including 90° in either direction.

A frame 72 comprising side members 74 and 76 and centrally located transverse members 78 and 80 is mounted on a stub-shaft 82 which passes through bearings 84 and 86. (See FIGURES 5 and 14.) These bearings are fixed and may be mounted in the positioning rods 30 and 70 which are secured by brackets (not shown) to the main frame of the carding machine. Such an arrangement will permit relative rotation of the stub-shaft 82 within the bearings 84 and 86. A segmental gear 88 is secured to the stub-shaft 82 and is adapted to be rotated therewith. A worm 90 mounted on a worm shaft 92 is manually operable and controllable by a hand wheel 94 which is rotatably mounted in a bracket 96 of the main frame of the carding machine.

It is apparent from FIGURE 5 that manual operation of the hand wheel 94 will rotate the worm shaft 92 thereon to impart angular rotation to the segmental gear 88 and the stub shaft 82. Rotation of the stub shaft 82 in the bearings 84 and 86 causes an equal angular rotation of the frame 72 whereby its angular relationship with respect to the main card cylinder 10 may be changed or adjusted. An endless doffing belt 98 provided with conventional card clothing covering is mounted on rollers 100 and 102 which are adapted to rotate within bearings 104 and 106 in the side frame member 76 and similar bearings in side frame member 74. This construction is basically similar to that set forth for the doffing belt and supporting rollers in FIGURE 2. Roller 102 may be positively driven by any desired means such as a motor 108 through a flexible shaft 110 at desired or required speeds.

With frame 72 in the position shown in FIGURE 5, the projections of the axes of rollers 100 and 102 are approximately at an angle of 45° to the line of close proximity between main card cylinder 10 and doffing belt 98, and also to the main axis 112 of the main card cylinder. Rotation of the frame 72 carrying the rollers 100 and 102 will change this to any desired degree permitted by the arcuate length of segmental gear 88. The arcuate length of the segmental gear should be sufficient to permit the changing of the angle between the axes of rollers 100 and 102 and the axis of the main card cylinder 10 within the range of from about 0° (parallelism) to at least about 45° in either direction, and even higher, should there be a need for such higher angles.

It should be remembered in setting or making adjustments of the angular relationship of the axes of the doffing belt rollers 100 and 102 to the axis 112 of the main card cylinder that, when the fibrous web is ultimately removed from the outer reach of the doffing belt, the total change in the direction of predominant fiber orientation is double the selected angularity. That is to say, for a relative angularity of 45° between the axes of the doffing belt rollers and the axis of the main card cylinder, the total resulting change in the direction of predominant fiber orientation is 90°. If the relative angularity is 22½°, the total change in fiber orientation is 45°; such a construction is shown in FIGURE 11.

The angularity doubling effect introduced by removing the fibers from the outer reach of the doffing belt, as illustrated in FIGURES 2–4, may be better understood by reference to FIGURE 15. That figure shows a fragmentary, diagrammatic perspective view of the lower portions of both inner reach 28 and outer reach 52 of doffing belt 22. The longitudinal axis L of the doffing belt and a typical fiber F are both shown on the opposite face of inner reach 28 (the latter being shown in broken line because it is hidden from the observer's view by the belt). The leading end of fiber F, designated F¹, points downwardly in its location on inner reach 28. After the direction of linear movement of belt 22 is reversed at the bottom of FIGURE 15, fiber F has come into view and so is shown in solid line on the near face of outer reach 52. The horizontal plane is represented at both the inner and outer reaches by a solid line. The vertical direction is shown at both reaches by a broken line, which at the inner reach also shows the position of the typical fiber F.

The relative position of fiber F on the doffing belt, including the angle between the longitudinal axis of the belt and fiber F, shown as about 35° in FIGURE 15, remains the same whether the fiber is moving down on inner reach 28 or upward on outer reach 52. From the point of view of an outside observer looking at FIGURE 15 from the position of the doffer comb, the disposition of the fiber on one side or the other of the longitudinal axis L of the belt has been changed by the reversal in direction of movement of the belt. Thus, as is seen from FIGURE 15, fiber F has in effect been "flopped over" on the other side of axis L, while that axis has retained its original inclination to the vertical direction. In its location on outer reach 52, of course, the leading end F¹ of fiber F now points upwardly.

The result is that the inclination of fiber F to the *vertical direction* while on the outer reach 52 is exactly double the angle of inclination of the fiber to the *longitudinal axis of the fiber assemblage* on the inner reach 28. Since the doffer comb is in the horizontal plane, and the final fiber assemblage is conveyed away from the comb at right angles to it, the longitudinal axis of the final web lies in a vertical plane. Thus, the angle between the fiber F and the longitudinal axis of the resulting fibrous web taken from doffing belt 22 is double the original angle of inclination of fiber F to longitudinal axis L of the doffing belt.

Another way to visualize what happens to the typical fiber F is to consider that an observer is moving with a stream of fibers moving downward on inner reach 28, and then with the same stream moving upward on outer reach 52. In both positions, it will be observed that fiber F slants ahead and to the right as one faces downstream. However, the inclination of the fiber with reference to the *external* standard of a vertical direction, for example, as seen by a fixed observer standing at the doffer comb, changes depending upon whether the stream itself is flowing in a downward or an upward direction.

In FIGURE 7, there is illustrated a modification of the means for removing the fibrous web from the doffing belt. A rotatable perforated hollow drum 114 mounted on a rotatable shaft 116 is positioned so as to create a narrow area or line of close proximity with the outer reach 130 of doffing belt 118 which, in FIGURE 7, has been positioned with its roller axis of the main card cylinder.

A main suction duct 124 and a secondary suction duct 126 are located within the rotatable perforated drum 114 and are connected to a suction manifold 128 whereby suction may be exerted in the area of close proximity between the doffing belt 118 and the perforated suction drum 114. As the fibers on the outer reach 130 of the doffing belt 118 approach the portion of the perforated drum behind which suction ducts 124 and 126 are located, they are attracted to the surface of the perforated drum 114 and are transferred thereto to form web W₀. This operation is procedurally similar to the use of the doffing comb 54 in FIGURES 2–4. When web W₀ reaches the far side of drum 114, it slides off the drum onto guide surface 131. This transfer of the web to guide surface 131 may be assisted, if desired, by blowing air out of the perforated drum just before the point of transfer is reached, to help loosen the web from the surface of the drum.

It is to be noted that the width of the resulting web W or W₀ which is produced by any of the above described modifications is approximately the same width as the web of fibers of the main card cylinder. This is due to the fact that any decrease of the width of the fibrous web as measured at right angles to the direction of movement as it is transferred from the main card cylinder to the doffing belt is compensated for by an equal increase in the width as measured at right angles to the direction of movement when the fibrous web is removed from the opposite reach of the doffing belt by the doffing comb or suction means.

In the embodiment of this invention illustrated in FIGURES 1–7, the fibrous nonwoven web which is transferred to the inner reach of the doffing belt 22 by the main card cylinder is carried completely around to the outer reach 52 thereof before being removed from the belt by doffer comb 54. There are three advantages to this arrangement. *First*, a single setting of the inclination of the longitudinal axis of the doffing belt to the vertical, as by the mechanism shown in FIGURES 5, 6 and 14, automatically establishes the angular shift in predominant fiber orientation with respect to the longitudinal axis of the fiber grouping which will be produced both by the transfer from the card cylinder to the doffing belt and by the removal of the fibers from the doffing belt at the doffing comb. This greatly increases the convenience of the apparatus. *Second*, with the embodiment under discussion, the angular shifts in predominant fiber orientation produced in each of the two steps of this method are equal in magnitude. As explained above, this increases the efficiency of the apparatus. *Third*, the arrangement in question makes it possible always to keep the doffer comb in a horizontal plane, no matter what angular shift in fiber orientation is to be produced. This increases the simplicity and efficiency of the conveying means provided to move the final assemblage of fibers away from the doffer comb.

However, it is not necessary to carry the fibers around to the outer reach of the doffing belt before removing them, if it is not desired to do so. In FIGURE 9, there is disclosed a method and apparatus wherein the fibrous materials may be removed from the inner reach 28 of the doffing belt 22 shortly after being transferred thereto from the main card cylinder 10. This figure shows the axes of the doffing belt rollers 24 and 26 parallel to each other and parallel to the main axis 12 of the main card 10, but located at an increased distance from each other which, in FIGURE 9, is shown to be about 65 inches apart, roll center to roll center. The fibers which are transferred from the cylindrical surface of the main card cylinder 10 to the doffing belt 22 at the line of close proximity adjacent the positioning rod 30 are carried on the lower inner reach 28 of the doffing belt 22 and are removed by a rotatable perforated hollow suction drum 114 mounted on a rotatable shaft 116, very similar in construction and operation to the drum shown in FIGURE 7.

In FIGURE 9, suction drum 114 is disposed at an angle of approximately 45° to the direction of movement of the lower inner reach 28 of the doffing belt and removes a web $W_2$ therefrom. It will be appreciated that, with the axes of rollers 24 and 26 parallel to the main axis 12 of the main card cylinder, the direction of movement of the lower or inner reach 28 of the doffing belt 22 will be 90° to the line of close proximity on the main card. This will not create any fiber shift in angularity or change in orientation during the transfer of fibers from the main card cylinder to the doffing belt. However, when the fibers reach the suction doffing drum 114, which is disposed at an angle of 45° to the direction of movement of the lower inner reach of the doffing belt, there will then be an angular fiber shift of 45° to the long axis of the moving web $W_2$.

It is to be noted that in the construction shown in FIGURE 9, there is an overall increase in the width of the web from the original 45 inch width on the main card 10 to a width of approximately 63.6 inches in the web $W_2$. This is due to the fact that the web does not change in width in being transferred from the main card 10 to the doffing belt 22 but that there is an increase when the doffing belt 22 is peeled from the doffing belt 22 by the drum web $W_2$ is peeled from the doffing belt 22 by the drum 114. In this embodiment in which the drum is positioned at an angle of 45° to the direction of movement of the belt, the increased width will be equal to the original width divided by the cosine of 45°. Other increases in width can be obtained by the use of other angles such as 30°, for example, in which the increase in width will be proportionately less. Specifically, the use of 30° for the angularity of the doffing drum yields a width of about 52 inches when the width of the starting web is 45 inches.

It is therefore to be realized that the present invention is also of utility in uses wherein it is desired to effect changes in the width of the web as accomplished above. In FIGURE 9, the direction of movement of the doffing belt is shown, primarily for illustrative purposes at a 0° angle to a plane normal to the line of close proximity with the main card cylinder. Such a configuration is not essential, however, and other configurations are possible wherein the angle between the direction of movement of the doffing belt and a plane normal to the line of close proximity with the main card cylinder may be increased to a positive value such as 15°, 30°, etc. It is necessary, however, that this angle be less than the angle between the direction of movement of the doffing belt and a plane normal to the line of close proximity with the doffing comb or other doffing means in order to obtain an increase in width of the fibrous web. In general, it may be stated that, starting with a particular angle between the card cylinder and the doffing belt, the greater the difference between that angle and the subsequent angle between the doffing belt and the doffer comb, the greater will be the increase in the width of the web. The difference will not be arithmetically proportional but will vary trigonometrically depending upon the angles involved and the values of the particular trigonometric relationships involved. The corollary of this concept is also to be noted in that, if the initial angle is greater than the subsequent angle, there will be a resulting corresponding decrease in the width of the fiber assemblage.

The operation of the vacuum doffing cylinder 114 is seen more clearly in FIGURE 9A which is a fragmentary front elevation of the modification shown in FIGURE 9. The direction of view of FIGURE 9A is taken directly along axis 116 of the cylinder 114. The positioning of the slide 125 for the fibrous web $W_2$ is clearly shown in the view.

As shown in FIGURE 10, the doffing belt 22 may be disposed on rollers 24 and 26 whose projections form an angle of 45° to both the main axis 12 of the main card cylinder 10 and to the line of close proximity between the card cylinder and the doffing belt. The fibers on the inner reach 28 of the doffing belt 22 are therefore transferred from the main card cylinder 10 with their original predominant fiber orientation, but move on the inner reach of the doffing belt at an angle of 45° to the long axis of the web. The oscillating doffer comb 53 and the oscillating shaft 61 of the embodiment shown in FIGURE 10 are positioned at an angle of 45° to the edges of the inner reach of the doffing belt 22, whereby the fibers in the resulting web $W_3$ are substantially at an angle of 90° to the long axis of the web. The web $W_3$ may then be deposited on a moving conveyor 63 and further processed or combined with other webs, as desired.

It is to be appreciated that the total change in fiber orientation in web $W_3$ with respect to the fiber orientation on main card cylinder 10 is equal to the algebraic sum of (1) the angle between the direction of movement of the doffing belt and the direction of peripheral movement of the main card cylinder and (2) the angle between the doffing comb and the plane normal to the direction of movement of the doffing belt. Angles of 45° and 45° are shown in FIGURE 9 and in FIGURE 10. Other combinations of angles such as 11¼° and 11¼°, or 15° and 15°, could be used to obtain total angular fiber orientation changes of 22½° and 30°, respectively. These angles need not necessarily be equal and angles of 25° and 35°, for example, could be employed to yield a total change in angularity of 60° with a concomitant increase in the width of the fibrous web.

The change in the angle of the predominant fiber orientation with respect to the long axis of the assemblage of fibers in the first transfer in the method of this invention can also be defined in terms of the relationship of the line of close proximity between the main card cylinder and the doffing belt to the new direction of movement of the assemblage of fibers after being transferred. More specifically, the change in the angle of the predominant fiber orientation is always the complement of the angle between the line of close proximity and the new direction of movement of the assemblage of fibers. That is to say, if the new direction of movement of the assemblage of fibers is normal (90°) to the line of close proximity, the change in angularity of the fibers with respect to the long axis of the assemblage of fibers moving in the new direction is 0°. If the new direction of movement of the assemblage of fibers is, say 70° to the line of close proximity, the change in direction of the fibers with respect to the long axis of the assemblage of fibers moving in the new direction is complementary to 70°, or 20°.

When the fibers are transferred angularly from the main card cylinder to the doffing belt and then are removed angularly a second time from the doffing belt, so that there are two angular shifts, the total change in the angle of predominant fiber orientation is the supplement of the algebraic sum of (1) the angle between the line of close proximity between the main card cylinder and the doffing belt and the new direction of movement of the assemblage of fibers on the doffing belt and (2) the angle between the direction of movement of the assemblage of fibers on the doffing belt and the longitudinal axis of the doffer comb or suction means by which the final assemblage of fibers is removed from the doffing belt. If the first angle is 70° and the second angle is also 70°, then their sum is 140° and the total change in the angle of the predominant fiber orientation is the supplement of 140°, or 40°.

An example of such a double change in angle is shown in FIGURE 11, where there is illustrated a modification of the present inventive concept wherein the direction of movement of the doffing belt 22 is positioned at an angle of 67½° to the line of close proximity.

In the event that a short doffing belt is used as disclosed and the fibers are permitted to be carried on to the outer reach 52 of the doffing belt, their removal by an oscillating doffer comb 53 positioned at an angle of 67½° to the direction of movement of the doffing belt will result in a fibrous web wherein the fibers have a total angle of 45° to the edges of the fibrous web. The calculation is 180° minus (67½° plus 67½°) which equals 45°. In such a case it is also to be observed that the fiber orientation on the outer reach is neither horizontal nor parallel to the axis of rotation of the main card cylinder, as was the case in the modification of FIGURES 2–4, but is actually at an angle of 45° with respect thereto.

The discussion so far has delat with the *change* in the angle of the predominant fiber orientation which is effected by use of the method of the present invention. The *final* direction of predominant fiber orientation, measured with respect to the longitudinal axis of the fiber assemblage resulting from use of the method of the invention, will depend of course on the *initial* direction of predominant fiber orientation with respect to the longitudinal axis of the arrangement of fibers formed in the first step of the method.

In the embodiments of the method which have been described, the fibers have first been formed into a card web. As has been explained above, because of the drafting action of a carding machine the fibers in a card web are normally predominantly oriented in the machine direction, or in other words at an angle of 0° to the longitudinal axis of the fibrous web produced by the machine. Thus, whenever the first step in the method of this invention is to form a card web, the direction of predominant fiber orientation in the final assemblage of fibers, measured with respect to the longitudinal axis thereof, is in the normal case the same as the change in the direction of predominant fiber orientation that is produced by use of this method. However, it must be understood that in every case, the final direction of predominant fiber orientation is determined by taking the algebraic sum of the initial direction of predominant fiber orientation with respect to the longitudinal axis of the arrangement of fibers formed in the first step of the method plus the change in direction of predominant orientation produced in the succeeding steps of the method.

Figure 12:
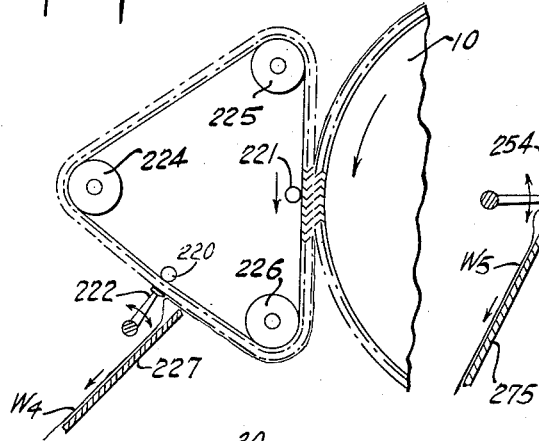
FIGURE 12 is a diagrammatic side elevation showing the main card cylinder and a modification of the doffing belt of the present inventive concept, with the doffing belt driven and supported on three rollers which have their axes parallel to the axis of the main card cylinder for the purpose of clarity.

It is not essential that the endless doffing belt be supported and driven merely by two rollers. As illustrated in FIGURE 12, three rollers, 224, 225 and 226 may be employed, creating three planar surfaces one of which is so positioned as to form a line of close proximity with the peripheral surface of the main card cylinder 10 and the second and third of which extend at planar angles of 120° in opposite directions with respect thereto. Positioning rods or rollers 220 and 221, if desired, may be employed in their usual manner as described previously to control and adjust the line of close proximity. Either the planar surfaces, or the substantially circular apex of the belt, may be selected for removal of fibers by a doffing comb 222 to form a web $W_4$ which is carried away on conveying means 227.

Figure 13:
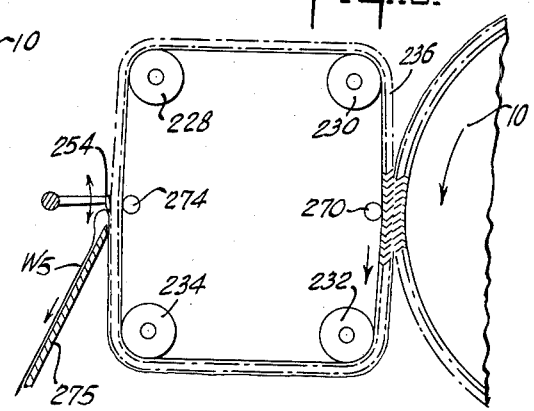
FIGURE 13 is a diagrammatic side elevation showing the main card cylinder and a modification of the doffing belt of the present inventive concept, with the doffing belt driven and supported on four rollers which have their axes parallel to the axis of the main card cylinder for the purpose of clarity.

The number of supporting rollers for the endless belt may be increased to four or more, if desired. In FIGURE 13, four rollers 228, 230, 232, 234 are disclosed providing four planar surfaces all of which can be used as fiber transferring or receiving surfaces. The first of these planar surfaces 236 is positioned in a line of close proximity to the main cylinder 10 and is employed to receive the fibrous material from the main card cylinder. The second, third and fourth planar surfaces may be employed in conjunction with a doffing comb 254 or a suction cylinder disposed at any angle to the direction of movement of the belt to create a nonwoven web $W_5$ wherein the fibers may be positioned at various angles to the long axis of the nonwoven web for removal on conveying means 275. Positioning rods or rollers 270 and 274 may again be employed in their function as described hereinbefore to control and adjust the area of close proximity.

It is to be noted that the axes of all rollers in FIGURES 12 and 13 are parallel to the axis of the main card cylinder as well as to the doffing means. This is done for purposes of clarity and the apparatus disclosed in these figures will normally not be operated as shown. Such a configuration will not create any shift in fiber angularity and the purpose of these figures is to illustrate the use of three and four rollers for the doffing belt and not to illustrate the angular shifting of the predominant fiber orientation.

In the embodiments of the inventive concept set forth hereinbefore, the plurality of fibers is disclosed as being oriented on a first surface, such as an orienting surface, or a carding machine, for example, and then transferred directly to a second or receiving surface, such as a doffing belt. Such an arrangement is efficient and is satisfactory but yields a fiber assemblage which is the product of one carding machine. It is not necessary that the second or receiving surface receive the plurality of fibers directly from a carding machine nor that the inventive concept be construed as limited to the product of merely one carding machine. FIGURE 16 sets forth a generic application of the inventive concept illustrating such other applications and uses.

A conveyor 280 is provided, one end of which is supported and driven by a roller 281 in the direction indicated. On the upper surface 282 of the conveyor 280, there is deposited a card web 283, or a plurality of card webs, say, up to 6, 8 or more. The direction of predominant fiber orientation is preferably in the direction of movement of the upper reach 282 of the belt 280. However, if desired, the direction of predominant fiber orientation may be at an angle to the direction of movement of the upper reach of the conveyor.

The assemblage of fibers 283 is carried forwardly by the conveyor 280 and passes under a feed plate 284 which is a smoothly polished plate extending forwardly from the upper reach of the conveyor in the form of an extension thereof. The front end or nose of the feed plate 284 is curved to receive a fluted feed roll 285 which is carried in bearings which rest in brackets at each side of the feed plate. The feed roll 285 rotates at a peripheral velocity at least equal to the surface velocity of the conveyor, or slightly greater, whereby a slight drafting action on the fibers is obtained.

The assemblage of fibers passing under the feed plate and over the feed roll is then introduced gradually and controllably to a worker roll 286 which is carried on a shaft held in special bearings in the machine sides. The worker roll 286 is a hollow cylinder which, depending upon the circumstances of the particular use, may have a diameter as low as about 9 inches (comparable to a licker-in), or as large as about 27 inches (comparable to a doffing cylinder). The length of the worker roll is normally from about 40 inches to about 45 inches.

The cylindrical surface of the worker roll 286 is covered with metallic or card clothing. The teeth of the metallic clothing are preferably finer than the teeth normally found on a licker-in. The card clothing can be similar to that found on a conventional doffing cylinder. The worker roll rotates at much higher peripheral speed than the feed roll and the fiber assemblage fed thereto is divellicated into individual fibers which, however, basically retain the predominant fiber orientation which existed prior thereto on the conveyor and at the nip roll.

The fibers are carried on the peripheral surface of the worker roll and define a first surface which is moved in the direction of rotation of the worker roll 286. The position of the worker roll is such that its peripheral surface forms a zone or line of close proximity with the near reach 287 of an endless doffing belt 288. This doffing belt is basically identical in construction to the doffing belts previously described and, in this embodiment, is preferably similar to the type illustrated in FIGURE 5. For the purpose of this description, the doffing belt 288 is adjusted so that the direction of movement of the near reach 287 is at an angle of 45° to the direction of movement of the fibers on the worker roll 286 at the line of close proximity. A positioning roller or rod 289 may be positioned in back of reach 287 to control and adjust the width of the line of close proximity.

The fibers are then transferred from the worker roll 286 to the near reach 287 of the doffing belt 288 at the line of close proximity, ordinarily with substantially the same predominant fiber orientation to a vertical reference plane. This is accomplished by moving the doffing belt at a surface velocity which is merely a fraction of the peripheral velocity of the worker roll, as described previously. However, since the direction of movement of the worker roll and the direction of movement of the doffer belt are at an angle of 45° at the line of close proximity, the fibers, as an assemblage, are deposited on the doffer belt at an angle of 45° to its direction of movement and then move therewith with their basic predominant fiber orientation at an angle of 45° to the longitudinal axis of the belt.

The fiber assemblage moves downwardly on the near reach 287 of the doffing belt 288, passes under the lower roll of the two doffing belt supporting rollers 290 and 291, and then moves upwardly on the far reach 292 of the doffing belt 288. In passing under the lower roll 291, the orientation of the fiber assemblage makes the apparent visual shift from a vertical orientation to a horizontal orientation with reference to a vertical reference plane. The basic predominant fiber orientation, with respect to the longitudinal axis of the belt 288, does not change, however, and the fibers remain at an angle of 45° to the direction of movement of the belt 288. This fiber movement is very similar in principle to that illustrated in FIGURE 4.

Doffing means, such as a suction or vacuum doffer 293, or a doffing comb, if desired, is positioned so as to extend horizontally, as shown in FIGURE 16, and form a zone or line of close proximity with the far reach 292 of the doffing belt 288. A positioning roller or rod may be positioned under the far reach 292 of the doffing belt 288 and cooperates with the vacuum doffer 293 to control and adjust the extent of the zone or line of close proximity. The vacuum doffer 293 is, of course, basically similar in construction to the vacuum doffer illustrated in FIGURE 7.

Inasmuch as the doffing means is horizontal and therefore at an angle of 45° to the far reach 292 of the doffing belt 288 which travels at an angle of 45° to the vertical, the fiber assemblage is peeled from the outer reach 292 and receives an additional shift of 45° to the longitudinal direction of the fiber assemblage and consequently is removed from the doffing belt 288 with the fibers lying with a predominant orientation which is substantially at 90° to the longitudinal direction of the fiber assemblage. In this form of a fiber assemblage W₆, it is removed from the vacuum doffer 293 on a slide or conveyor 294 to be further processed and treated, as desired.

With reference to the term "orienting surface," as used herein and applied primarily to the surface of a carding machine, it is to be appreciated that such a term is not to be construed as limited to a card machine solely. As used herein, its in intended to cover any and all surfaces which work upon the fibers in such a way as to increase their predominant fiber orientation in a given direction or, if the fibers are deposited on the surface in question originally with a predominant fiber orientation in a given direction, the surface will at least maintain that predominant fiber orientation.

The invention will be further illustrated in greater detail by the following specific examples. It should be understood, however, that although these examples may describe in particular detail some of the more specific features of the invention, they are given primarily for purposes of illustration and the invention in its broader aspects is not to be construed as limited thereto.

*Example 1*

A nonwoven fabric of fibrous materials is prepared with apparatus illustrated in FIGURES 1–4 as follows: The main card cylinder is wrapped with 2-inch fillet card clothing. It has a width of 45 inches, an outside diameter of 50 inches and is operated at about 170 revolutions per minute for a peripheral linear velocity of about 740 yards per minute. The doffer belt is also wrapped with 2-inch fillet card clothing. The belt has a width of about 36 inches and a length between the axes of the supporting rollers of about 54 inches. It is operated at a linear surface velocity of about 25 yards per minute. The ratio of the main card cylinder peripheral linear velocity to the belt linear velocity is about 29 to 1. The fibers used are 2 denier viscose rayon having an average staple length of about 2 inches. The angle between the direction of rotation and predominant fiber orientation of the main cylinder and the axis of the rollers of the doffer belt is 45°. The clearance between the main cylinder and the doffing belt is 0.007 inch. The fibers are fed to the main card cylinder and are carded into predominant orientation on the main card cylinder in the direction of rotation thereof in accordance with known procedure. The carded fibers are doffed from the main cylinder to the inner reach of the doffing belt, move downwardly and then upwardly on the outer reach of the doffing belt and then are transferred by a doffer comb means disposed at an angle of 45° to the direction of movement of the doffing belt. The fibers are consequently disposed at 90° to the machine direction. The web is then plied with another web of the same weight containing fibers of the same type but oriented in the machine direction. The width of the resulting cross-laid fiber assemblage is about 45 inches. The weight of the fabric is about 400 grains per square yard and it possesses approximately equal strength (1:1) in the long and cross direction. The fiber assemblage is bonded with a dispersion of polyvinyl acetate to deposit about 5% solids by weight (dry basis) thereon. The resulting nonwoven fabric is useful as a dinner placemat.

*Example 2*

A nonwoven fabric of fibrous materials is prepared with apparatus illustrated in FIGURES 1–4 as follows: The main card cylinder is wrapped with 2-inch fillet card clothing. It has a width of 45 inches, an outside diameter of 50 inches and is operated at about 190 revolutions per minute for a linear surface velocity of about 830 yards per minute. The doffer belt is also wrapped with 2-inch fillet card clothing. The belt has a width of 36 inches and a length between the axes of the supporting rollers of about 54 inches. It is operated at a linear surface velocity of about 25 yards per minute. The ratio of the main card cylinder peripheral linear velocity to the belt linear velocity is about 33 to 1. The fibers used are 2 denier viscose rayon having an average staple length of about 2 inches. The angle between the direction of rotation and predominant fiber orientation of the main cylinder and the axis of the rollers of the doffer belt is 45°. The clearance between the main cylinder and the doffing belt is 0.007 inch. The fibers are fed to the main card cylinder and are carded into predominant orientation on the main card cylinder in the direction of rotation thereof in accordance with known procedures. The carded fibers are doffed from the main cylinder to the inner reach of the doffing belt, move downwardly and then upwardly on the outer reach of the doffing belt and then are transferred by a doffer comb means disposed at an angle of 45° to the direction of movement of the doffing belt to the main conveyor belt where they are plied with another web of the same weight containing fibers of the same type but oriented in the machine direction. The width of the resulting cross-laid assemblage of fibers is about 45 inches. The weight of the fabric is about 430 grains per square yard and it possesses approximately equal strengths (1:1) in the long and cross direction. The assemblage of fibers is bonded with a dispersion of polyvinyl acetate to deposit about 5% solids by weight (dry basis) thereon. The resulting nonwoven fabric is useful as a dinner place-mat.

*Example 3*

A nonwoven fabric of fibrous materials is prepared with apparatus illustrated in FIGURES 5–7 as follows: The main card cylinder is wrapped with 2-inch fillet card clothing. It has a width of 45 inches, an outside diameter of 50 inches and is operated at about 200 revolutions per minute for a linear surface velocity of about 870 yards per minute. The doffer belt is also wrapped with 2-inch fillet card clothing. The belt has a width of about 45 inches and a length between the axes of the supporting rollers of about 54 inches. It is operated at a linear surface velocity of about 25 yards per minute. The ratio of the main card cylinder peripheral linear velocity to the belt linear velocity is about 35 to 1. The fibers used are viscose rayon having an average staple length of about 2 inches. The angle between the direction of rotation and predominant fiber orientation of the main cylinder and the axis of the rollers of the doffer-belt is adjusted to be about 22½°. The clearance between the main cylinder and the doffing belt is 0.007 inch. The fibers are fed to the main card cylinder and are carded into predominant orientation on the main card cylinder in the direction of rotation thereof in accordance with known procedures. The carded fibers are doffed from the main cylinder to the inner reach of the doffing belt, the angle between the line of close proximity and a plane normal to the direction of movement of the doffing belt being 22½°. The fibers thus doffed move downwardly and then upwardly on the outer reach of the doffing belt and then are transferred by suction means disposed at an angle of 22½° to a plane normal to the direction of movement of the doffing belt. The change in orientation is 45°. The web is deposited on the main conveyor belt where it is plied with another web of the same weight containing fibers of the same type but oriented 45° in the opposite direction. The width of the resulting cross-laid fiber assemblage is about 45 inches. The weight of the fabric is about 450 grains per square yard and it possesses approximately equal strengths (1:1) in the long and cross direction. The fiber assemblage is bonded with a dispersion of polyvinyl acetate to deposit about 5% solids by weight (dry basis) thereon. The resulting nonwoven fabric is useful as a dinner place-mat.

*Example 4*

A nonwoven fabric of fibrous materials is prepared with the apparatus of FIGURE 9 to determine the increase in width of the web. The operating conditions and raw materials noted in Example 1 are used as set forth therein except that the direction of movement of the doffing belt is normal (90°) to the line of close proximity with the card and the suction doffer is at an angle of 45° to the direction of movement of the doffer belt. The original width of the web is 45 inches on the 45 inch card; the final width of the web removed by the suction doffer is about 63 inches.

Although the fibrous materials dispersed on the wires of the card clothing of the main card cylinder have been referred to in this disclosure in such terms as to create the impression that a "web" of fibers exists thereon, such is true only in the very broad sense. Precisely speaking, those fibrous materials are in the form of individual fibers but, when considered in gross, may be collectively considered loosely as a "web" of fibers existing in a sort of sheet-like form having long and cross dimensions.

Although several specific examples of the inventive concept have been described, the same should not be construed as limited thereby nor to the specific embodiments shown but to include various other equivalent embodiments as set forth in the claims appended hereto. It is understood that any suitable changes, modifications and variations may be made without departing from the spirit and scope of the invention.

What is claimed is:

1. A method of producing a continuous fibrous web in which the direction of predominant fiber orientation is at a desired angle of more than 0° and up to 90° to the longitudinal axis thereof which comprises: moving a fibrous web comprising a plurality of fibers oriented predominantly in a given direction in one direction on a first movable surface, the direction of predominant fiber orientation, the direction of movement of said fibrous web, and the direction of movement of said first movable surface being substantially the same; transferring said fibrous web from said first movable surface to a second movable surface having a continuous line of close proximity with said first movable surface, said second movable surface moving at a lesser linear speed than the first movable surface and in a direction having a predetermined angle of more than 0° and up to but no greater than about 60° to a plane normal to said continuous line of close proximity whereby the direction of predominant fiber orientation of said fibrous web on said second movable surface possesses said predetermined angle of more than 0° and up to but no greater than about 60° to the direction of movement of said fibrous web and to the direction of movement of said second movable surface; and removing said fibrous web from said second movable surface at a second continuous line of close proximity disposed at a second predetermined angle of more than 0° and up to but no greater than 75° to a plane normal to the direction of movement of said second movable surface, whereby the direction of predominant fiber orientation of said fibrous web removed from said second movable surface possesses an angle equal to the sum of said predetermined angles and also equal to said desired angle of more than 0° and up to 90° to the longitudinal axis thereof.

2. A method of producing a continuous fibrous web in which the direction of predominant fiber orientation is at a desired angle of more than 0° and up to 90° to the longitudinal axis thereof which comprises: moving a fibrous web comprising a plurality of fibers oriented predominantly in a given direction in one direction on a first movable surface, the direction of predominant fiber orientation, the direction of movement of said fibrous web, and the direction of movement of said first movable surface being substantially the same; transferring said fibrous web from said first movable surface to a second movable surface having a continuous line of close proximity with said first movable surface, said second movable surface moving at a lesser linear speed than the first movable surface and in a direction having a predetermined angle of more than 0° and up to but no greater than about 60° to a plane normal to said continuous line of close proximity whereby the direction of predominant fiber orientation of said fibrous web on said second movable surface possesses said predetermined angle of more than 0° and up to but no greater than about 60° to the direction of movement of said fibrous web and to the direction of movement of said second movable surface; removing said fibrous web from said second movable surface at a second continuous line of close proximity disposed at a second predetermined angle of more than 0° and up to but no greater than 75° to a plane normal to the direction of movement of said second movable surface, whereby the direction of predominant fiber orientation of said fibrous web removed from said second movable surface possesses an angle equal to the sum of said predetermined angles and also equal to said desired angle of more than 0° and up to 90° to the longitudinal axis thereof; and conveying said fibrous web away from said second continuous line of close proximity.

3. A method of producing a continuous fibrous web in which the direction of predominant fiber orientation is at a desired angle of more than 0° and up to 90° to the longitudinal axis thereof which comprises: orienting a plurality of fibers predominantly in a given direction on a first movable surface into a fibrous web; moving said fibrous web comprising said plurality of fibers oriented predominantly in said given direction in one direction on said first movable surface, the direction of predominant fiber orientation, the direction of movement of said fibrous web, and the direction of movement of said first movable surface being substantially the same; transferring said fibrous web from said first movable surface to a second movable surface having a continuous line of close proximity with said first movable surface, said second movable surface moving at a lesser linear speed than the first movable surface and in a direction having a predetermined angle of more than 0° and up to but no greater than about 60° to a plane normal to said continuous line of close proximity whereby the direction of predominant fiber orientation of said fibrous web on said second movable surface possesses said predetermined angle of more than 0° and up to but no greater than about 60° to the direction of movement of said fibrous web and to the direction of movement of said second movable surface; and removing said fibrous web from said second movable surface at a second continuous line of close proximity disposed at a second predetermined angle of more than 0° and up to but no greater than 75° to a plane normal to the direction of movement of said second movable surface, whereby the direction of predominant fiber orientation of said fibrous web removed from said second movable surface possesses an angle equal to the sum of said predetermined angles and also equal to said desired angle of more than 0° and up to 90° to the longitudinal axis thereof.

4. A method of producing a continuous fibrous web in which the direction of predominant fiber orientation is at a desired angle of more than 0° and up to 90° to the longitudinal axis thereof which comprises: moving a fibrous web comprising a plurality of fibers oriented predominantly in a given direction in one direction on a rotatable surface, the direction of predominant fiber orientation, the direction of movement of said fibrous web, and the direction of movement of said rotatable surface being substantially the same; transferring said fibrous web from said rotatable surface to a movable surface having a continuous line of close proximity with said rotatable surface, said movable surface moving at a lesser linear speed than the rotatable surface and in a direction having a predetermined angle of more than 0° and up to but no greater than about 60° to a plane normal to said continuous line of close proximity whereby the direction of predominant fiber orientation of said fibrous web on said movable surface possesses said predetermined angle of more than 0° and up to but no greater than about 60° to the direction of movement of said fibrous web and to the direction of movement of said movable surface; and removing said fibrous web from said movable surface at a second continuous line of close proximity disposed at a second predetermined angle of more than 0° and up to but no greater than 75° to a plane normal to the direction of movement of said movable surface, whereby the direction of predominant fiber orientation of said fibrous web removed from said movable surface possesses an angle equal to the sum of said predetermined angles and also equal to said desired angle of more than 0° and up to 90° to the longitudinal axis thereof.

5. A method of producing a continuous fibrous web in which the direction of predominant fiber orientation is at a desired angle of more than 0° and up to 90° to the longitudinal axis thereof which comprises: moving a fibrous web comprising a plurality of fibers oriented predominantly in a given direction in one direction on a first movable surface, the direction of predominant fiber orientation, the direction of movement of said fibrous web, and the direction of movement of said first movable surface being substantially the same; transferring said fibrous web from said first movable surface to a second movable surface having a continuous line of close proximity with said first movable surface, said second movable surface moving at a lesser linear speed than the first movable surface and in a direction having a predetermined angle of about one-half said desired angle to a plane normal to said continuous line of close proximity whereby the direction of predominant fiber orientation of said fibrous web on said second movable surface possesses said predetermined angle of about one-half said desired angle to the direction of movement of said fibrous web and to the direction of movement of said second movable surface; and removing said fibrous web from said second movable surface at a second continuous line of close proximity disposed at a second predetermined angle of about one-half said desired angle to a plane normal to the direction of movement of said second movable surface, whereby the direction of predominant fiber orientation of said fibrous web removed from said second movable surface possesses an angle equal to the sum of said predetermined angles and also equal to said desired angle of more than 0° and up to 90° to the longitudinal axis thereof.

6. A method of producing a continuous fibrous web in which the direction of predominant fiber orientation is at a desired angle of more than 0° and up to 90° to the longitudinal axis thereof which comprises: moving a fibrous web comprising a plurality of fibers oriented predominantly in a given direction in one direction on a first movable surface, the direction of predominant fiber orientation, the direction of movement of said fibrous web, and the direction of movement of said first movable surface being substantially the same; transferring said fibrous web from said first movable surface to a second movable surface having a continuous line of close proximity with said first movable surface, said second movable surface moving at a lesser linear speed than the first movable surface and in a direction having a predetermined angle of more than 0° and up to but no greater than about 60° to a plane normal to said continuous line of close proximity whereby the direction of predominant fiber orientation of said fibrous web on said second movable surface possesses said predetermined angle of more than 0° and up to but no greater than 60° to the direction of movement of said fibrous web and to the direction of movement of said second movable surface; reversing the direction of movement of said second movable surface and said fibrous web moving therewith without changing the angular relationship of the direction of predominant fiber orientation with respect thereto; and removing said fibrous web from said second movable surface at a second continuous line of close proximity disposed at a second predetermined angle of more than 0° and up to but no greater than 75° to a plane normal to the direction of movement of said second movable surface, whereby the direction of predominant fiber orientation of said fibrous web removed from said second movable surface possesses an angle equal to the sum of said predetermined angles and also equal to said desired angle of more than 0° and up to 90° to the longitudinal axis thereof.

7. A method of producing a continuous fibrous web in which the direction of predominant fiber orientation is at a desired angle of more than 0° and up to 90° to the longitudinal axis thereof which comprises: moving a fibrous web comprising a plurality of fibers oriented predominantly in a given direction in one direction on a first movable surface, the direction of predominant fiber orientation, the direction of movement of said fibrous web, and the direction of movement of said first movable surface being substantially the same; transferring said fibrous web from said first movable surface to a second movable surface having a continuous line of close proximity with said first movable surface, said second movable surface moving at a lesser linear speed than the first movable surface and in a direction having a predetermined angle of more than 0° and up to about 45° to a plane normal to said continuous line of close proximity whereby the direction of predominant fiber orientation of said fibrous web on said second movable surface possesses said predetermined angle of more than 0° and up to but no greater than about 45° to the direction of movement of said fibrous web and to the direction of movement of said second movable surface; and removing said fibrous web from said second movable surface at a second continuous line of close proximity disposed at a second predetermined angle of more than 0° and up to about 45° to a plane normal to the direction of movement of said second movable surface, whereby the direction of predominant fiber orientation of said fibrous web removed from said second movable surface possesses an angle equal to the sum of said predetermined angles and also equal to said desired angle of more than 0° and up to 90° to the longitudinal axis thereof.

8. A method of producing a continuous fibrous web in which the direction of predominant fiber orientation is at a desired angle of more than 0° and up to 90° to the longitudinal axis thereof which comprises: moving a fibrous web comprising a plurality of fibers oriented predominantly in a given direction in one direction on a first movable surface, the direction of predominant fiber orientation, the direction of movement of said fibrous web, and the direction of movement of said first movable surface being substantially the same; transferring said fibrous web from said first movable surface to a second movable surface having a continuous line of close proximity with said first movable surface, said second movable surface moving at a lesser linear speed than the first movable surface and in a direction having a predetermined angle of more than 0° and up to about 45° to a plane normal to said continuous line of close proximity whereby the direction of predominant fiber orientation of said fibrous web on said second movable surface possesses said predetermined angle of more than 0° and up to but no greater than about 45° to the direction of movement of said fibrous web and to the direction of movement of said second movable surface; reversing the direction of movement of said second movable surface and said fibrous web moving therewith without changing the angular relationship of the direction of predominant fiber orientation with respect thereto; and removing said fibrous web from said second movable surface at a second continuous line of close proximity disposed at a second predetermined angle of more than 0° and up to about 45° to a plane normal to the direction of movement of said second movable surface, said second predetermined angle being equal to said first-mentioned predetermined angle, whereby the direction of predominant fiber orientation of said fibrous web removed from said second movable surface possesses an angle equal to the sum of said predetermined angles and also equal to said desired angle of more than 0° and up to 90° to the longitudinal axis thereof.

9. A method of producing a continuous fibrous web in which the direction of predominant fiber orientation is at a desired angle of more than 0° and up to 90° to the longitudinal axis thereof which comprises: moving a fibrous web comprising a plurality of fibers oriented predominantly in a given direction in one direction on a first movable surface, the direction of predominant fiber orientation, the direction of movement of said fibrous web, and the direction of movement of said first movable surface being substantially the same; transferring said fibrous web from said first movable surface to a second movable surface having a continuous line of close proximity with said first movable surface, said second movable surface moving at a lesser linear speed than the first movable surface and in a direction having a predetermined angle of about one-half said desired angle to a plane normal to said continuous line of close proximity whereby the direction of predominant fiber orientation of said fibrous web on said second movable surface possesses said predetermined angle of about one-half said desired angle to the direction of movement of said fibrous web and to the direction of movement of said second movable surface; reversing the direction of movement of said second movable surface and said fibrous web moving therewith without changing the angular relationship of the direction of predominant fiber orientation with respect thereto; and removing said fibrous web from said second movable surface at a second continuous line of close proximity disposed at a second predetermined angle of about one-half said desired angle to a plane normal to the direction of movement of said second movable surface, whereby the direction of predominant fiber orientation of said fibrous web removed from said second movable surface possesses an angle equal to the sum of said predetermined angles and also equal to said desired angle of more than 0° and up to 90° to the longitudinal axis thereof.

10. A method of producing a continuous fibrous web in which the direction of predominant fiber orientation is at a desired angle of more than 0° and up to 90° to the longitudinal axis thereof which comprises: moving a fibrous web comprising a plurality of fibers oriented predominantly in a given direction in one direction on a rotatable surface, the direction of predominant fiber orientation, the direction of movement of said fibrous web, and the direction of movement of said rotatable surface being substantially the same; transferring said fibrous web from said rotatable surface to a movable surface having a continuous line of close proximity with said rotatable surface, said movable surface moving at a lesser linear speed than said rotatable surface and in a direction having a predetermined angle of more than 0° and up to but no greater than about 60° to a plane normal to said continuous line of close proximity whereby the direction of predominant fiber orientation of said fibrous web on said movable surface possesses said predetermined angle of more than 0° and up to but no greater than about 60° to the direction of movement of said fibrous web and to the direction of movement of said movable surface; reversing the direction of movement of said movable surface and said fibrous web moving therewith without changing the angular relationship of the direction of predominant fiber orientation with respect thereto; and removing said fibrous web from said movable surface at a second continuous line of close proximity disposed at a second predetermined angle of more than 0° and up to but no greater than 75° to a plane normal to the direction of movement of said movable surface, whereby the direction of predominant fiber orientation of said fibrous web removed from said movable surface possesses an angle equal to the sum of said predetermined angles and also equal to said desired angle of more than 0° and up to 90° to the longitudinal axis thereof.

11. A method of producing a continuous fibrous web in which the direction of predominant fiber orientation is at a desired angle of more than 0° and up to 90° to the longitudinal axis thereof which comprises: moving a fibrous web comprising a plurality of fibers oriented predominantly in a given direction in one direction on a rotatable surface, the direction of predominant fiber orientation, the direction of movement of said fibrous web, and the direction of movement of said rotatable surface being substantially the same; transferring said fibrous web from said rotatable surface to a movable surface having a continuous line of close proximity with said rotatable surface, said movable surface moving at a lesser linear speed than said rotatable surface and in a direction having a predetermined angle of more than 0° and up to about 45° to a plane normal to said continuous line of close proximity whereby the direction of predominant fiber orientation of said fibrous web on said movable surface possesses said predetermined angle of more than 0° and up to but no greater than about 45° to the direction of movement of said fibrous web and to the direction of movement of said movable surface; reversing the direction of movement of said movable surface and said fibrous web moving therewith without changing the angular relationship of the direction of predominant fiber orientation with respect thereto; and removing said fibrous web from said movable surface at a second continuous line of close proximity disposed at a second predetermined angle of more than 0° and up to about 45° to a plane normal to the direction of movement of said movable surface, whereby the direction of predominant fiber orientation of said fibrous web removed from said movable surface possesses an angle equal to the sum of said predetermined angles and also equal to said desired angle of more than 0° and up to 90° to the longitudinal axis thereof.

12. Apparatus for producing a continuous fibrous web in which the direction of predominant fiber orientation is at a desired angle of more than 0° and up to 90° to the longitudinal axis thereof which comprises: a first movable surface for moving a fibrous web comprising a plurality of fibers oriented predominantly in a given direction in one direction on said first movable surface, the direction of predominant fiber orientation, and the direction of movement of said fibrous web, and the direction of movement of said first movable surface being substantially the same; a second movable surface for receiving said fibrous web from said first movable surface, said second movable surface having a continuous line of close proximity with said first movable surface, said second movable surface moving at a lesser linear speed than the first movable surface and in a direction having a predetermined angle of more than 0° and up to but no greater than about 60° to a plane normal to said continuous line of close proximity whereby the direction of predominant fiber orientation of said fibrous web on said second movable surface possesses said predetermined angle of more than 0° and up to but no greater than about 60° to the direction of movement of said fibrous web and to the direction of movement of said second movable surface; and means for removing said fibrous web from said second movable surface at a second continuous line of close proximity disposed at a second predetermined angle of more than 0° and up to but no greater than 75° to a plane normal to the direction of movement of said second movable surface, whereby the direction of predominant fiber orientation of said fibrous web removed from said second movable surface possesses an angle equal to the sum of said predetermined angles and also equal to said desired angle of more than 0° and up to 90° to the longitudinal axis thereof.

13. Apparatus for producing a continuous fibrous web in which the direction of predominant fiber orientation is at a desired angle of more than 0° and up to 90° to the longitudinal axis thereof which comprises: a first movable surface for moving a fibrous web comprising a plurality of fibers oriented predominantly in a given direction in one direction on said first movable surface, the direction of predominant fiber orientation, the direction of movement of said fibrous web, and the direction of movement of said first movable surface being substantially the same; a second movable surface for receiving said fibrous web from said first movable surface, said second movable surface having a continuous line of close proximity with said first movable surface, said second movable surface moving at a lesser linear speed than the first movable surface and in a direction having a predetermined angle of more than 0° and up to but no greater than about 60° to a plane normal to said continuous line of close proximity whereby the direction of predominant fiber orientation of said fibrous web on said second movable surface possesses said predetermined angle of more than 0° and up to but no greater than about 60° to the direction of movement of said fibrous web and to the direction of movement of said second movable surface; means for removing said fibrous web from said second movable surface at a second continuous line of close proximity disposed at a second predetermined angle of more than 0° and up to but no greater than 75° to a plane normal to the direction of movement of said second movable surface, whereby the direction of predominant fiber orientation of said fibrous web removed from said second movable surface possesses an angle equal to the sum of said predetermined angles and also equal to said desired angle of more than 0° and up to 90° to the longitudinal axis thereof; and means for conveying said fibrous web away from said second continuous line of close proximity.

14. Apparatus for producing a continuous fibrous web in which the direction of predominant fiber orientation is at a desired angle of more than 0° and up to 90° to the longitudinal axis thereof which comprises: a first movable surface for moving a fibrous web comprising a plurality of fibers oriented predominantly in a given direction in one direction on said first movable surface, the direction of predominant fiber orientation, the direction of movement of said fibrous web, and the direction of movement of said first movable surface being substantially the same; a second movable surface for receiving said fibrous web from said first movable surface, said second movable surface having a continuous line of close proximity with said first movable surface, said second movable surface moving at a lesser linear speed than the first movable surface and in a direction having a predetermined angle of more than 0° and up to but no greater than about 60° to a plane normal to said continuous line of close proximity whereby the direction of predominant fiber orientation of said fibrous web on said second movable surface possesses said predetermined angle of more than 0° and up to but no greater than about 60° to the direction of movement of said fibrous web and to the direction of movement of said second movable surface; means for reversing the direction of movement of said second movable surface and said fibrous web moving therewith without changing the angular relationship of the direction of predominant fiber orientation with respect thereto; and means for removing said fibrous web from said second movable surface at a second continuous line of close proximity disposed at a second predetermined angle of more than 0° and up to but no greater than 75° to a plane normal to the direction of movement of said second movable surface, whereby the direction of predominant fiber orientation of said fibrous web removed from said second movable surface possesses an angle equal to the sum of said predetermined angles and also equal to said desired angle of more than 0° and up to 90° to the longitudinal axis thereof.

15. Apparatus for producing a continuous fibrous web in which the direction of predominant fiber orientation is at a desired angle of more than 0° and up to 90° to the longitudinal axis thereof which comprises: conveying means for moving a fibrous web comprising a plurality of fibers oriented predominantly in a given direction in one direction thereon, the direction of predominant fiber orientation, the direction of movement of said fibrous web, and the direction of movement of said conveying means being substantially the same; a movable surface for receiving said fibrous web from said conveying means, said movable surface having a continuous line of close proximity with said conveying means, said movable surface moving at a lesser linear speed than the conveying means and in a direction having a predetermined angle of more than 0° and up to but no greater than about 60° to a plane normal to said continuous line of close proximity whereby the direction of predominant fiber orientation of said fibrous web on said movable surface possesses said predetermined angle of more than 0° and up to but no greater than about 60° to the direction of movement of said fibrous web and to the direction of movement of said movable surface; and a doffing means for removing said fibrous web from said movable surface at a second continuous line of close proximity disposed at a second predetermined angle of more than 0° and up to but no greater than 75° to a plane normal to the direction of movement of said movable surface, whereby the direction of predominant fiber orientation of said fibrous web removed from said movable surface possesses an angle equal to the sum of said predetermined angles and also equal to said desired angle of more than 0° and up to 90° to the longitudinal axis thereof.

16. Apparatus for producing a continuous fibrous web in which the direction of predominant fiber orientation is at a desired angle of more than 0° and up to 90° to the longitudinal axis thereof which comprises: a rotatable card cylinder having a rotatable surface for moving a fibrous web comprising a plurality of fibers oriented predominantly in a given direction in one direction on said rotatable surface, the direction of predominant fiber orientation, the direction of movement of said fibrous web, and the direction of movement of said rotatable surface being substantially the same; an endless doffing belt having a movable surface for receiving said fibrous web from said rotatable surface, said movable surface having a continuous line of close proximity with the full width of said rotatable surface, said movable surface moving at a lesser linear speed than said rotatable surface and in a direction having a predetermined angle of more than 0° and up to but no greater than about 60° to a plane normal to said continuous line of close proximity whereby the direction of predominant fiber orientation of said fibrous web on said movable surface possesses said predetermined angle of more than 0° and up to but no greater than about 60° to the direction of movement of said fibrous web and to the direction of movement of said movable surface; and means for removing said fibrous web from said movable surface at a second continuous line of close proximity disposed at a second predetermined angle of more than 0° and up to but no greater than 75° to a plane normal to the direction of movement of said movable surface, whereby the direction of predominant fiber orientation of said fibrous web removed from said movable surface possesses an angle equal to the sum of said predetermined angles and also equal to said desired angle of more than 0° and up to 90° to the longitudinal axis thereof.

References Cited in the file of this patent

UNITED STATES PATENTS

| | | |
|---|---|---|
| 718,261 | Laurency | Jan. 13, 1903 |
| 1,683,812 | Walsh | Sept. 11, 1928 |
| 2,130,944 | Bowen | Sept. 20, 1938 |
| 2,156,455 | Kleine et al. | May 2, 1939 |
| 2,168,775 | Hurst et al. | Aug. 8, 1939 |
| 2,416,390 | Hitt | Feb. 25, 1947 |
| 2,648,876 | Phillips et al. | Aug. 18, 1953 |
| 2,774,128 | Secrist | Dec. 18, 1956 |

FOREIGN PATENTS

| | | |
|---|---|---|
| 10,074 | Great Britain | of 1844 |
| 1,387 | Great Britain | of 1856 |
| 2,785 | Great Britain | of 1857 |
| 224,188 | Switzerland | Feb. 1, 1943 |